(12) United States Patent
Gudmundsson et al.

(10) Patent No.: US 12,492,020 B2
(45) Date of Patent: Dec. 9, 2025

(54) ELECTRIC AUTONOMOUS AIRCRAFT

(71) Applicant: Joby Aero, Inc., Santa Cruz, CA (US)

(72) Inventors: Snorri Gudmundsson, Daytona Beach, FL (US); Chunlei Liu, Los Angeles, CA (US); Kevin Antcliff, Yorktown, VA (US); Sydney Hardy, Burbank, CA (US); Kanthi Latha Bahmidipati, Detroit, MI (US); Marc Piette, Orinda, CA (US); Maxime Marie Christophe Gariel, San Francisco, CA (US)

(73) Assignee: JOBY AERO, INC., Santa Cruz, CA (US)

( * ) Notice: Subject to any disclaimer, the term of this patent is extended or adjusted under 35 U.S.C. 154(b) by 0 days.

(21) Appl. No.: 18/591,053

(22) Filed: Feb. 29, 2024

(65) Prior Publication Data

US 2024/0294277 A1 Sep. 5, 2024

Related U.S. Application Data

(60) Provisional application No. 63/487,886, filed on Mar. 2, 2023.

(51) Int. Cl.
*B64U 10/25* (2023.01)
*B64U 20/30* (2023.01)
*B64U 101/61* (2023.01)

(52) U.S. Cl.
CPC .............. *B64U 10/25* (2023.01); *B64U 20/30* (2023.01); *B64U 2101/61* (2023.01)

(58) Field of Classification Search
CPC ........ B64D 27/31; B64D 27/34; B64U 10/25; B64U 20/30; B64U 50/19; B64U 50/30; B64U 2101/61

USPC .......................................................... 244/140
See application file for complete search history.

(56) References Cited

U.S. PATENT DOCUMENTS

| 9,694,911 B2 * | 7/2017 | Bevirt .................. B64C 39/068 |
| 11,919,631 B2 * | 3/2024 | Bower ................... B64D 27/34 |
| 12,122,525 B2 * | 10/2024 | Beno ..................... B64D 27/31 |

(Continued)

OTHER PUBLICATIONS

Paul Dye (Feb. 25, 2020). "KitPlanes Flight Review: Sling TSi". <https://www.avweb.com/features/kitplanes-flight-review-sling-tsi/> (Year: 2020).*

(Continued)

*Primary Examiner* — Joshua E Rodden
(74) *Attorney, Agent, or Firm* — Dority & Manning, P.A.

(57) ABSTRACT

An aircraft includes a fuselage that includes a nose portion, a cabin portion, an underwing portion, and an aft portion. The nose portion includes sensors that generate sensor data. The cabin portion is aft of the nose portion and includes a passenger cabin. The underwing portion is aft of the cabin portion and includes a wing attachment region and a battery bay. The aft portion is aft of the underwing portion. A wing assembly including motor mounts and control surfaces is attached to the wing attachment region such that the underwing portion of the fuselage is located under the wing assembly. A tail assembly is attached to the aft portion. The electric motors are attached to motor mounts such that the propellers are in a pusher configuration facing rearward. An autonomous control system controls the electric motors and control surfaces based on the sensor data.

21 Claims, 32 Drawing Sheets

(56) References Cited

U.S. PATENT DOCUMENTS

| | | | | |
|---|---|---|---|---|
| 2012/0043413 | A1* | 2/2012 | Smith | B64C 29/0033 244/12.4 |
| 2019/0135413 | A1* | 5/2019 | Moore | B64D 31/16 |
| 2020/0148347 | A1 | 5/2020 | Bevirt et al. | |
| 2020/0317353 | A1* | 10/2020 | Bevirt | B64C 11/28 |
| 2021/0206483 | A1* | 7/2021 | Lee | B64C 29/0025 |
| 2021/0206487 | A1* | 7/2021 | Iqbal | B64D 27/406 |
| 2021/0362849 | A1* | 11/2021 | Bower | B64C 29/0033 |
| 2021/0403154 | A1 | 12/2021 | Tighe et al. | |
| 2022/0144421 | A1* | 5/2022 | Rimanelli | B64C 29/0033 |
| 2022/0177145 | A1* | 6/2022 | Melack | H02J 1/10 |
| 2022/0388628 | A1* | 12/2022 | Regnier | B64C 3/34 |
| 2023/0103521 | A1 | 4/2023 | Bower et al. | |
| 2023/0143459 | A1 | 5/2023 | Clark | |
| 2023/0382523 | A1* | 11/2023 | Yan | B60L 58/22 |
| 2024/0140598 | A1* | 5/2024 | Doo | B64C 29/0025 |
| 2024/0308655 | A1* | 9/2024 | Villa | B64C 29/0033 |

OTHER PUBLICATIONS

Beta Technologies Wikipedia article, Internet Archive—Wayback Machine, https://web.archive.org/web/20220617034734/https://en.wikipedia.org/wiki/Beta_Technologies, archived Jun. 17, 2022. accessed on May 6, 2024.
Bye Aerospace Wikipedia article, Internet Archive—Wayback Machine, https://web.archive.org/web/20230124105630/http://en.wikipedia.org/wiki/Bye_Aerospace, archived Jan. 24, 2023, accessed on May 2, 2024.
Electra Aero article on Aviationtoday.com, https://www.aviationtoday.com/2021/07/27/nasa-awards-electra-aero-sttr-contract-estol-aircraft/, dated Jul. 27, 2021, accessed on May 6, 2024.
Eviation Alice Wikipedia article, Internet Archive—Wayback Machine, https://web.archive.org/web/20221228015115/https://en.wikipedia.org/wiki/Eviation_Alice, archived Dec. 28, 2022, accessed on May 2, 2024.
Joby Aviation Wikipedia article, Internet Archive—Wayback Machine, https://web.archive.org/web/20230226232436/https://en.wikipedia.org/wiki/Joby_Aviation, archived on Feb. 26, 2023, accessed on May 2, 2024.
Lilium Jet Article at robbreport.com, https://robbreport.com/motors/aviation/lilium-special-edition-electric-jet-1234751448/, dated Sep. 22, 2022, accessed on May 6, 2024.
Vertical Aerospace VX4, Internet Archive—Wayback Machine, https://web.archive.org/web/20230129090303/https://evtol.news/vertical-aerospace-VA-1X, archived Jan. 29, 2023, accessed on May 6, 2024.
Wing Configuration Wikipedia article—Wayback Machine, https://web.archive.org/web/20230127224028/https://en.wikipedia.org/wiki/Wing_configuration, archived Jan. 27, 2023, accessed on May 6, 2024.
Wisk Aero Article, https://newatlas.com/aircraft/wisk-aero-6th-generation-autonomous-four-seat-evtol-air-taxi/,Oct. 3, 2022, accessed May 2, 2024.

* cited by examiner

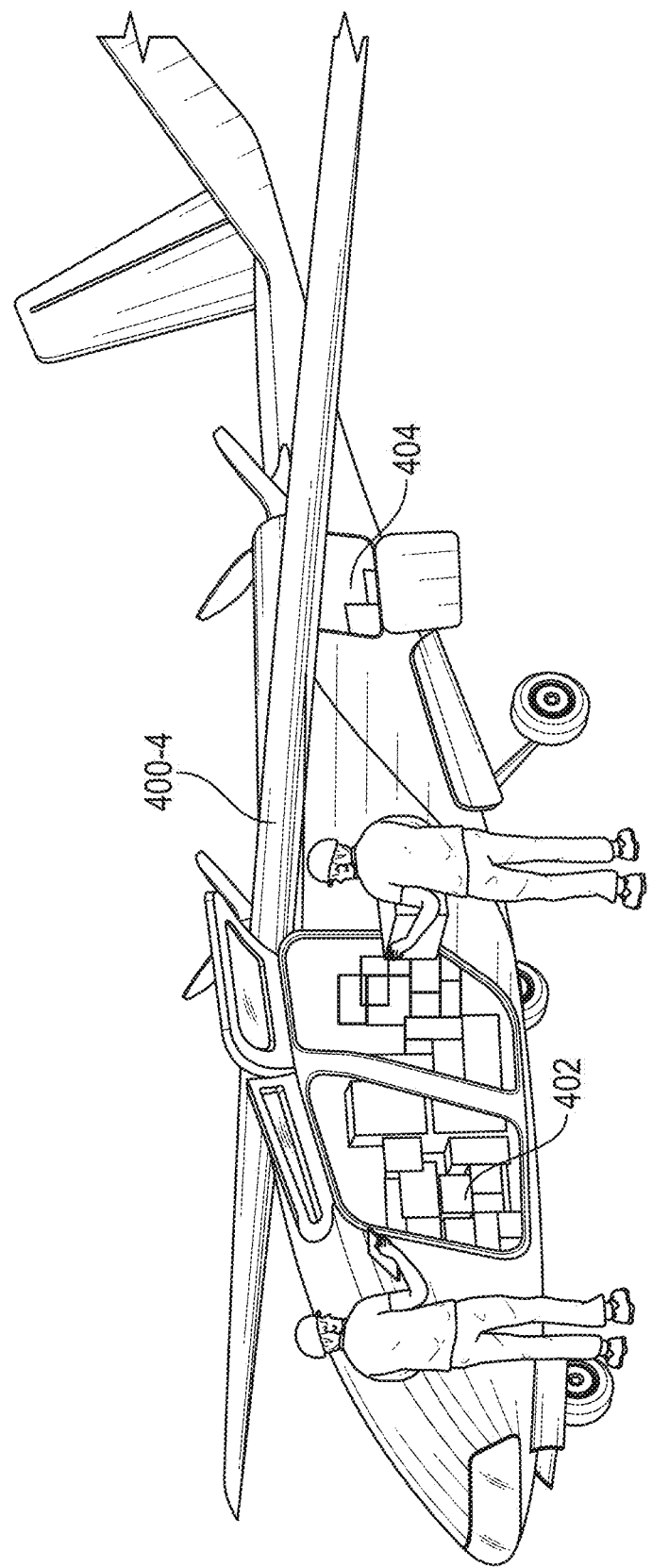

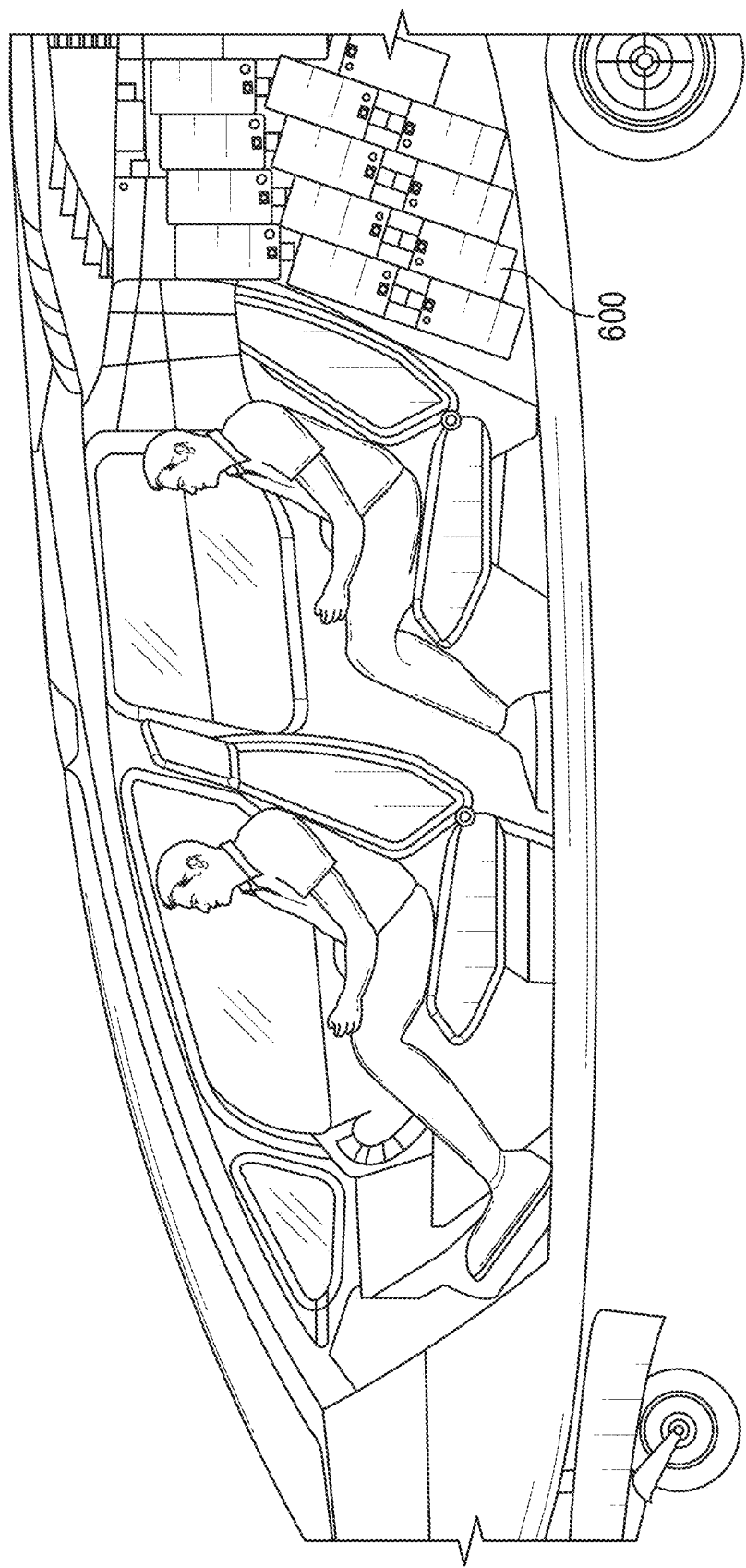

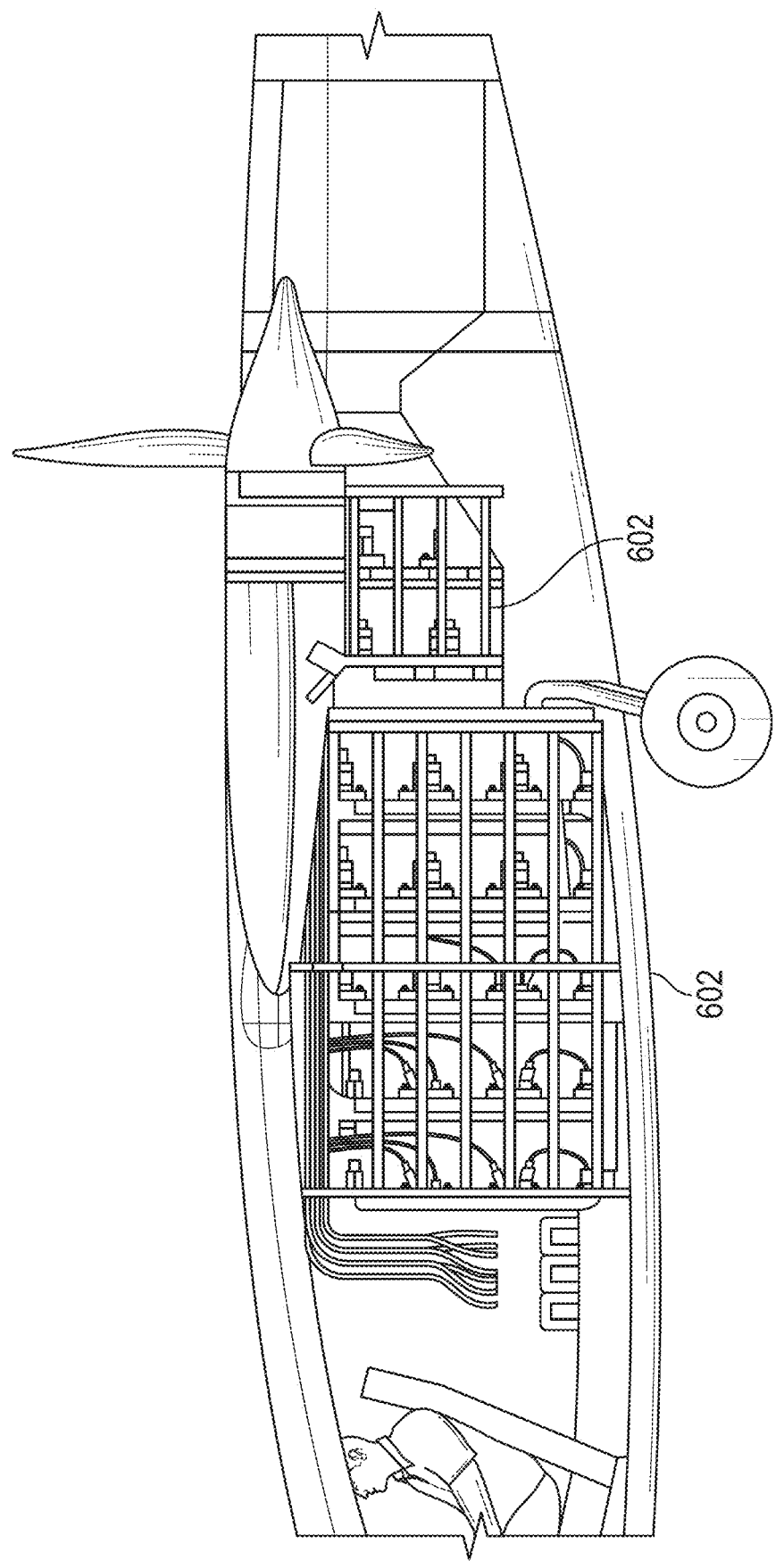

ELECTRIC AUTONOMOUS AIRCRAFT

CROSS-REFERENCE TO RELATED APPLICATION

This application claims the benefit of U.S. Provisional Application No. 63/487,886, filed on Mar. 2, 2023. The disclosure of the above application is incorporated herein by reference in its entirety.

FIELD

The present disclosure relates to an unmanned aircraft.

BACKGROUND

An unmanned aircraft system may include an unmanned aircraft (e.g., without an onboard pilot) and other unmanned aircraft system components, such as a ground-based controller. In some implementations, an unmanned aircraft may include sensors, a software stack, actuators, a communication system, and other components. The sensors may provide information about the aircraft state. The unmanned aircraft control system may execute the software stack to control the aircraft actuators based on acquired sensor information in order to pilot the aircraft during a planned mission. In some implementations, the communication system may provide for control and data exchange during a mission. An unmanned aircraft may implement various degrees of autonomy during a mission. In some cases, an unmanned aircraft may be controlled by a human operator at a ground control station.

SUMMARY

In one example, a passenger aircraft comprises a fuselage that includes a nose portion, a cabin portion, an underwing portion, and an aft portion. The nose portion includes sensors that generate sensor data. The cabin portion is aft of the nose portion. The cabin portion includes a passenger cabin and a passenger entry area through which passengers enter the passenger cabin. The underwing portion is aft of the cabin portion. The underwing portion includes a wing attachment region at a top of the underwing portion. The underwing portion includes a battery bay that houses a battery assembly. The aft portion is aft of the underwing portion. The aircraft comprises a wing assembly attached to the wing attachment region of the fuselage such that the underwing portion of the fuselage is located under the wing assembly. The wing assembly includes motor mounts and control surfaces. The aircraft comprises a tail assembly that is attached to the aft portion of the fuselage. The aircraft comprises electric motors including propellers, wherein the electric motors are attached to the motor mounts such that the propellers are in a pusher configuration facing rearward, and wherein the propellers are on an opposite side of the wing assembly as the cabin portion of the fuselage. The aircraft comprises an autonomous control system that controls the electric motors and the control surfaces based on the sensor data generated by the sensors included in the nose portion.

In one example, a cargo aircraft comprises a fuselage that includes a nose portion, a cargo portion, an underwing portion, and an aft portion. The nose portion includes sensors that generate sensor data. The cargo portion is aft of the nose portion. The cargo portion includes a cargo hold and an opening through which cargo is loaded into the cargo hold. The underwing portion is aft of the cargo portion. The underwing portion includes a wing attachment region at a top of the underwing portion. The underwing portion includes a battery bay that houses a battery assembly. The aft portion is aft of the underwing portion. The aircraft comprises a wing assembly attached to the wing attachment region of the fuselage such that the underwing portion of the fuselage is located under the wing assembly. The wing assembly includes motor mounts and control surfaces. The aircraft comprises a tail assembly that is attached to the aft portion of the fuselage. The aircraft comprises electric motors including propellers. The electric motors are attached to the motor mounts such that the propellers are in a pusher configuration facing rearward. The propellers are on an opposite side of the wing assembly as the cargo portion of the fuselage. The aircraft comprises an autonomous control system that controls the electric motors and the control surfaces based on the sensor data generated by the sensors included in the nose portion.

BRIEF DESCRIPTION OF THE DRAWINGS

The present disclosure will become more fully understood from the detailed description and the accompanying drawings.

FIGS. 1D-1I are illustrations of example passenger aircraft.

FIGS. 4A-4C illustrate example electric autonomous cargo aircraft.

FIGS. 6A-6C illustrate example battery assembly locations within an aircraft battery bay.

In the drawings, reference numbers may be reused to identify similar and/or identical elements.

DETAILED DESCRIPTION

FIGS. 1A-10 illustrate example features of electric autonomous aircraft (e.g., 100, 400). For example, FIGS. 1A-2B illustrate example passenger aircraft 100-1, 100-2, . . . , 100-9, such as 2 passenger aircraft or 4 passenger aircraft. In some examples, passenger aircraft may be referred to generally using callout 100. As another example, FIGS. 4A-4C illustrate example cargo aircraft 400-1, 400-2, 400-3, 400-4. In some examples, cargo aircraft may be referred to generally using callout 400. The electric autonomous aircraft features described herein may be implemented on passenger aircraft and/or cargo aircraft configurations. In some implementations, passenger aircraft and cargo aircraft configurations may include the same/similar structures, but may differ in the cabin and cargo areas. The configurations of passenger aircraft 100 and cargo aircraft 400 that are illustrated and described herein are only example configurations. As such, different aircraft 100, 400 may include additional/alternative features, depending on the implementation. The passenger aircraft 100 and/or cargo aircraft 400 may be referred to hereinafter generally as "aircraft 100" or "aircraft 400." In some cases illustrated and described herein, aircraft may be called out as passenger aircraft 100 or cargo aircraft 400, as the features of the aircraft may be implemented in either type of aircraft described herein.

Some figures include example dimensions. For example, some figures include explicit dimensions (e.g., see FIGS. 2A-2B). As another example, some dimensions may be implied by the size of aircraft features relative to other illustrated objects, such as humans, packages (e.g., see FIG. 4C), or other objects. The example explicit and implied dimensions illustrated and described herein are only example aircraft dimensions. As such, passenger and/or cargo aircraft 100, 400 including alternative dimensions may be manufactured.

Figure 1A:
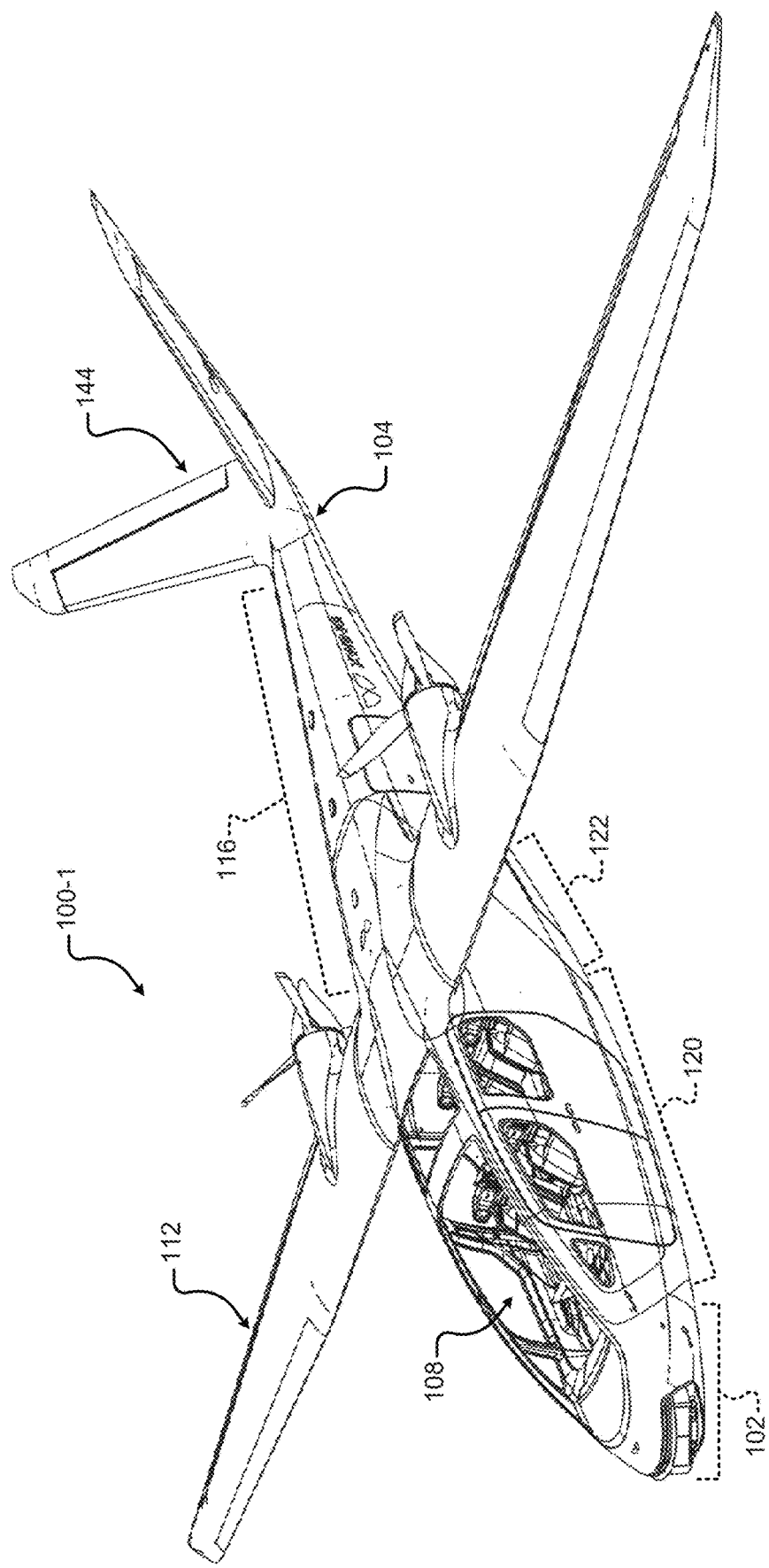
FIGS. 1A-1C are line drawings of an example electric autonomous passenger aircraft.
Figure 1B:
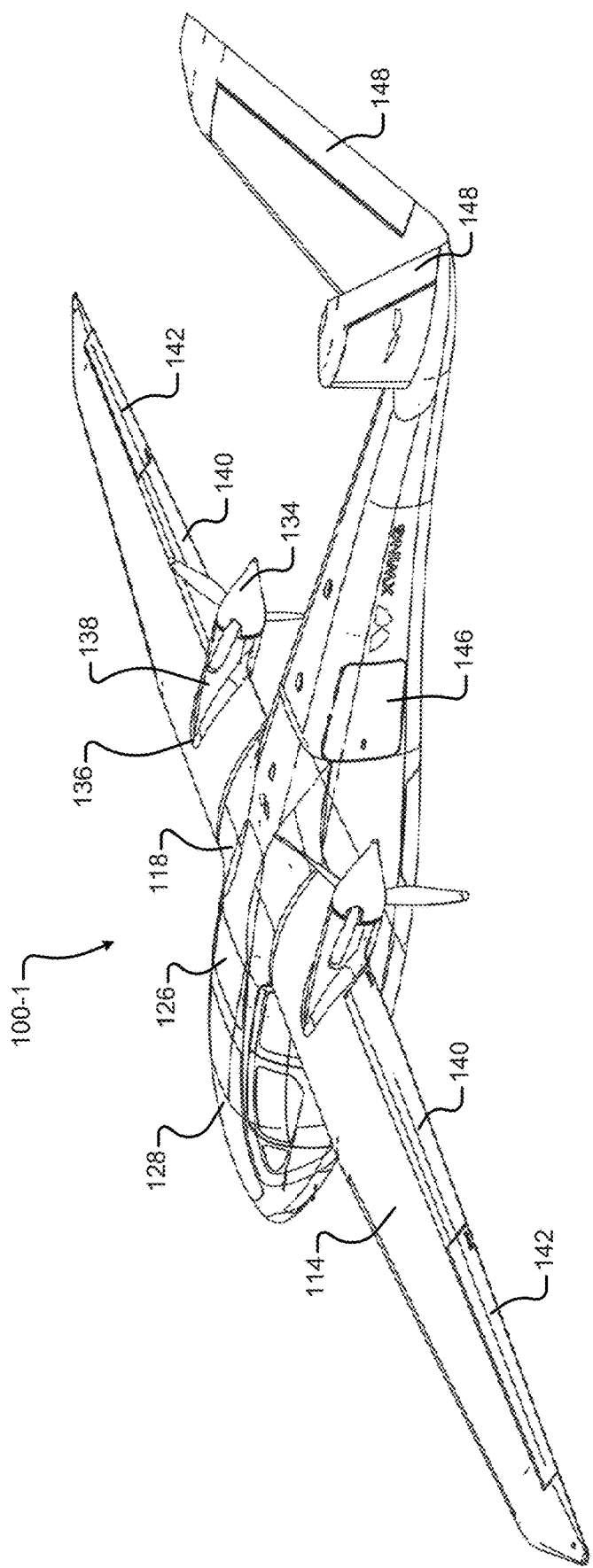
Figure 1C:
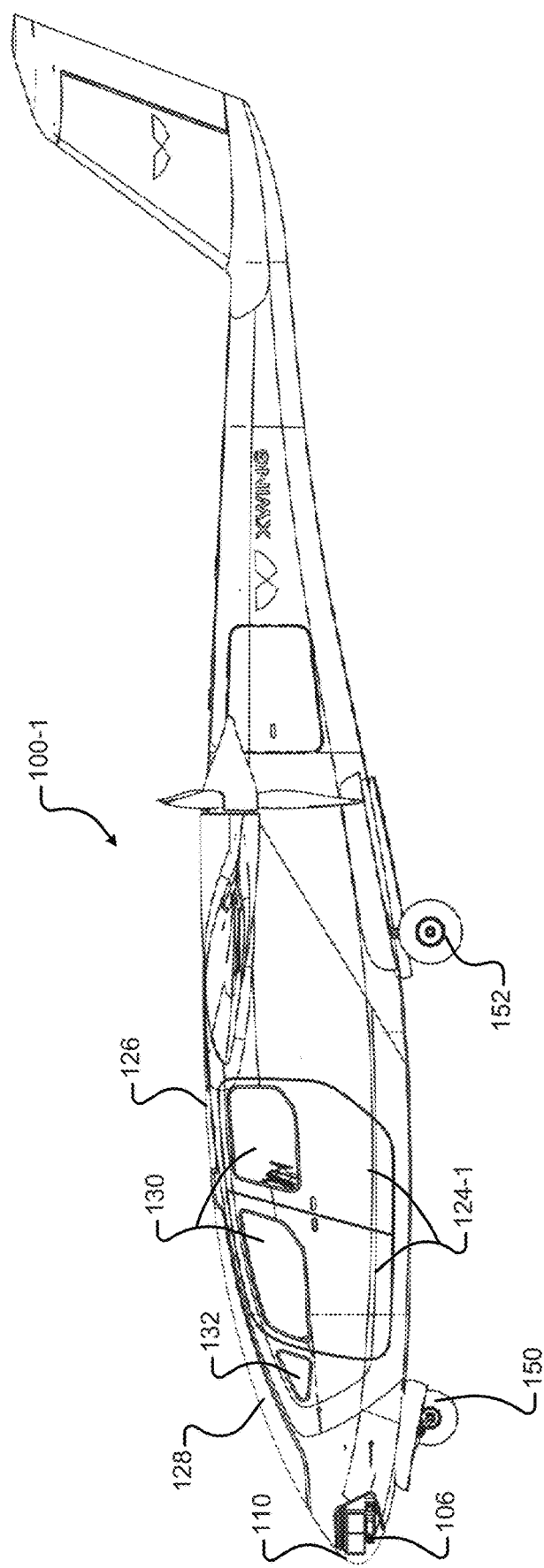
Figure 1D:
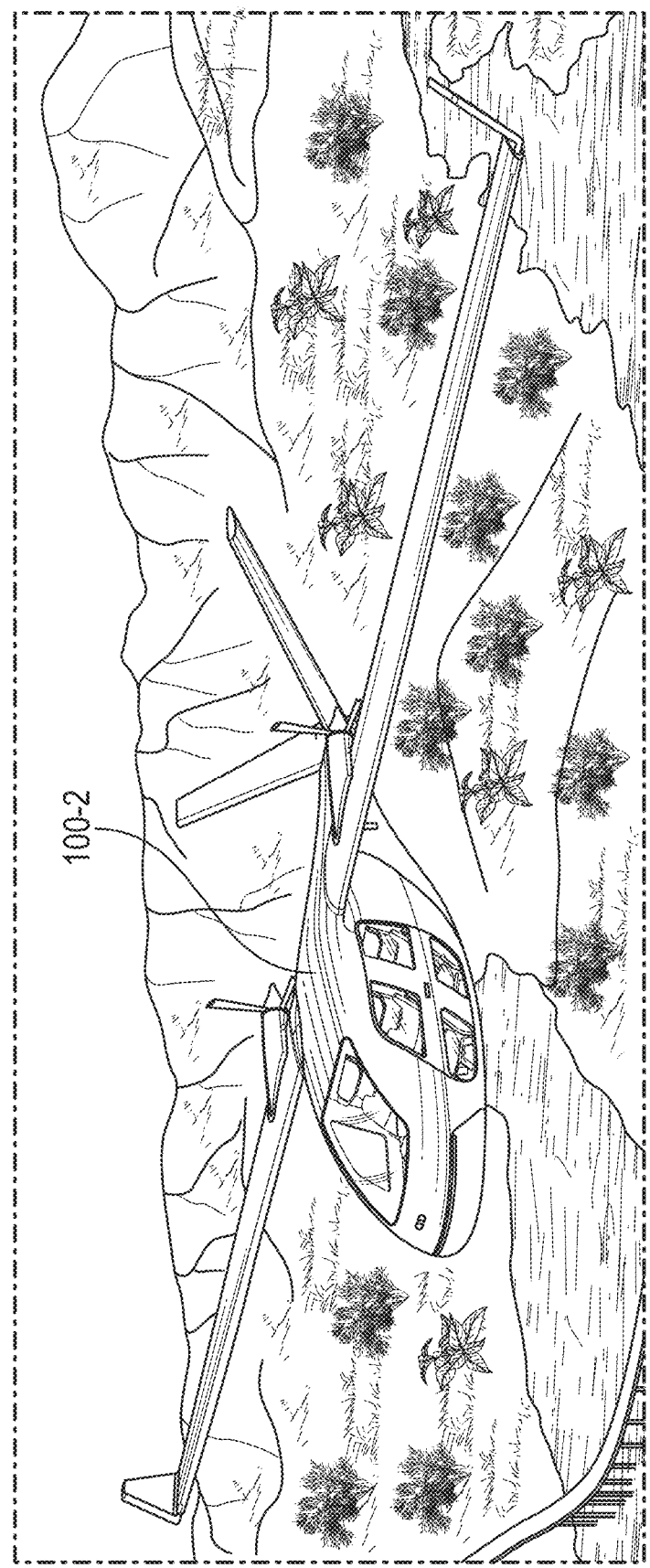
Figure 1E:
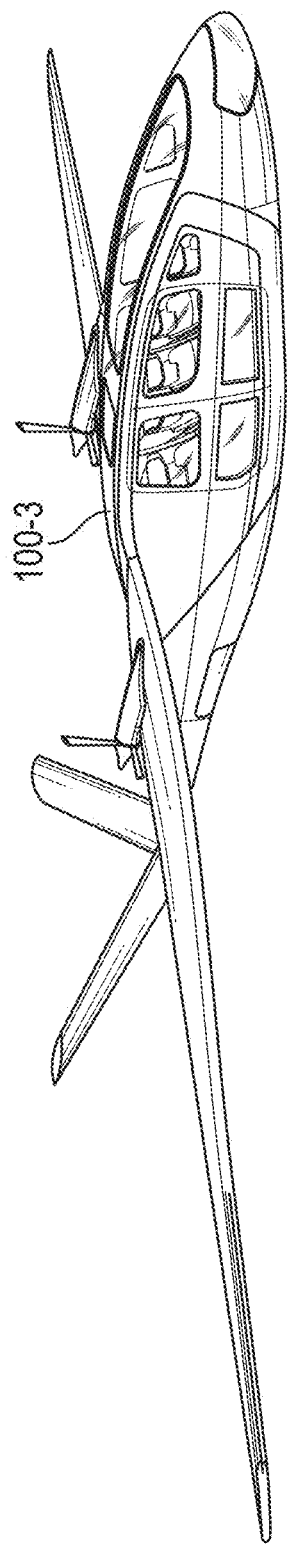

FIGS. 1A-1C are line drawings of an example electric autonomous passenger aircraft 100-1. Additional illustrations of example passenger aircraft 100-2, 100-3, . . . , 100-9 are included in FIGS. 1D-2B. The aircraft 100, 400 may implement a low drag design using techniques described herein. In some implementations, the aircraft 100, 400 may be certified to 14 Code of Federal Regulations (CFR) Part 23.

Referring to FIGS. 1A-1C, the aircraft 100-1 includes a fuselage that extends from a nose portion 102 of the fuselage to a tail assembly attachment region 104 of the fuselage. As illustrated and described herein, the fuselage may be a composite semi-monocoque construction with frames, bulkheads, intercostals bonded to stiffened skin, and other components, although other fuselage structures may be manufactured. In some implementations, fabrication materials may include reinforced plastic composites or any other material that achieves a low-drag surface quality, high strength, and light weight. In some implementations, surfaces may be class-A for lower skin friction through improved surface quality. Additionally, the aircraft may be designed to be conducive to large volume manufacturing.

The nose portion 102 of the aircraft 100-1 may include an avionics bay that includes aircraft avionics (e.g., nose avionics 106). Example avionics may include, but are not limited to computing devices, sensors, navigation systems, communication systems, a flight management system, and a flight control system (e.g., see FIG. 10). In some implementations, aircraft avionics, wiring, and/or other components may be placed under the floor of the cabin 108, in the ceiling, and/or along other airframe structural members.

In some implementations, the avionics bay may be integrated into the fuselage. For example, the internal structure of the fuselage may define the avionics bay. In some implementations, one or more portions of the avionics bay may be removable from the aircraft 100-1. For example, the avionics may be included in one or more housings that may be removable from the aircraft 100-1. In some implementations, the avionics bay and/or other avionics housings may include appropriate transparent materials in areas where needed (e.g., transparent to cameras and other sensors). In FIGS. 1A-1C, nose avionics 106 are included in an avionics bay covered by an avionics cover portion 110 in the nose portion 102 of the aircraft 100-1.

The nose portion 102 including the avionics bay may be integrated such that the nose portion 102 and the aircraft skin forms a continuous/smooth aerodynamic surface across any seams in the external aircraft structure associated with the avionics bay and nose portion 102 of the fuselage. In some implementations, the avionics bay may be accessed through an external access panel that may be accessed outside of the aircraft 100-1. Additionally, or alternatively, the avionics bay may be accessed from the forward cabin (e.g., one or more access panels in the forward cabin).

The aircraft 100-1 includes a wing assembly 112 (e.g., a single wing) attached to the fuselage at a wing attachment region 500 of the fuselage (e.g., see FIGS. 5A-5D). The wing assembly 112 is located on top of the fuselage such that the fuselage and top of the wing surface 114 form a smooth continuous aerodynamic surface. For example, the surface of the aircraft from above the cabin 108, over the wing surface 114, towards the aft/rear portion 116 of the fuselage may be a smooth continuous aerodynamic surface. The smooth surface may include one or more wing/fuselage fairings 118 at the intersection of the wing assembly 112 and the fuselage to improve aerodynamics. As described herein, the wing assembly 112 may be attached to the fuselage in a wing attachment region 500 (e.g., to frames 522, 524 in FIGS. 5C-5D) that may also support the batteries and landing gear. In some implementations, low drag may be achieved using wing planform geometry combined with natural laminar flow airfoils.

A cabin portion 120 of the fuselage may be located aft of the nose portion 102 (e.g., aft of the avionics bay). The cabin portion 120 of the fuselage includes a cabin 108 that may accommodate one or more passengers. Example figures illustrate four passenger configurations (e.g., see FIGS. 1A-1H) and two passenger configurations (e.g., see FIGS. 5B-5C). In some implementations, the aircraft 100 may not include a pilot. Although a pilot may not be required to pilot the aircraft 100, in some implementations, the aircraft may include space for one or more pilots.

The cabin portion 120 of the fuselage may be located between the nose portion 102 and an underwing portion 122 of the fuselage. The underwing portion 122 of the fuselage may refer to a portion of the fuselage that is located under the wing 112. In some implementations, the cabin 108 may be located completely ahead of the wing 112 (e.g., completely ahead of the underwing portion 122). In some implementations, a portion of the cabin 108 may extend under the wing 112, such that the underwing portion 122 of the fuselage includes a portion of the cabin 108 and a portion of a battery bay (e.g., see FIG. 5A).

The cabin portion 120 of the fuselage may include one or more cabin doors 124-1, 124-2, 124-3 (generally "cabin doors 124" or "cargo doors 124"). In a passenger aircraft, passengers may open the one or more doors 124 to access the cabin 108 through one or more doorway openings. In a cargo aircraft, cargo may be loaded through the one or more cargo openings while the doors 124 are open. The cabin doors 124 may be implemented in a variety of ways, some of which are illustrated in FIGS. 1F, 2B, 4B, 4C, and 5C.

Figure 1F:
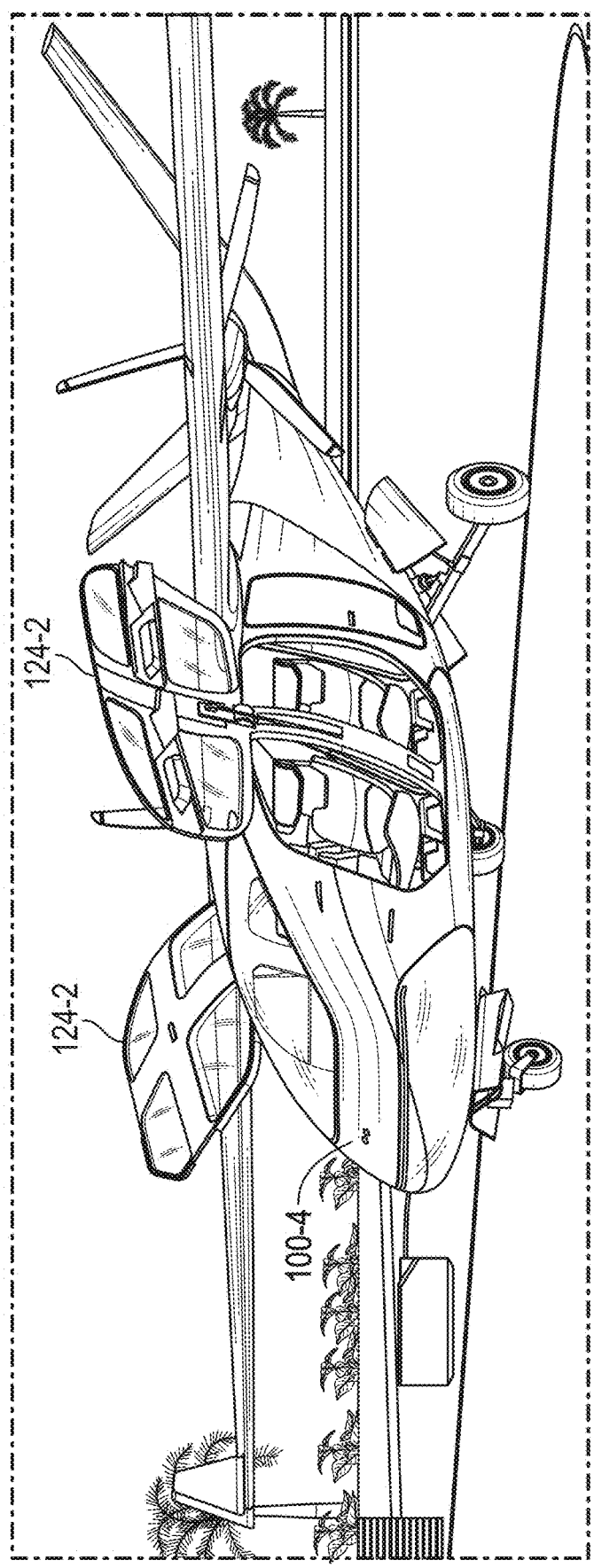
Figure 1G:
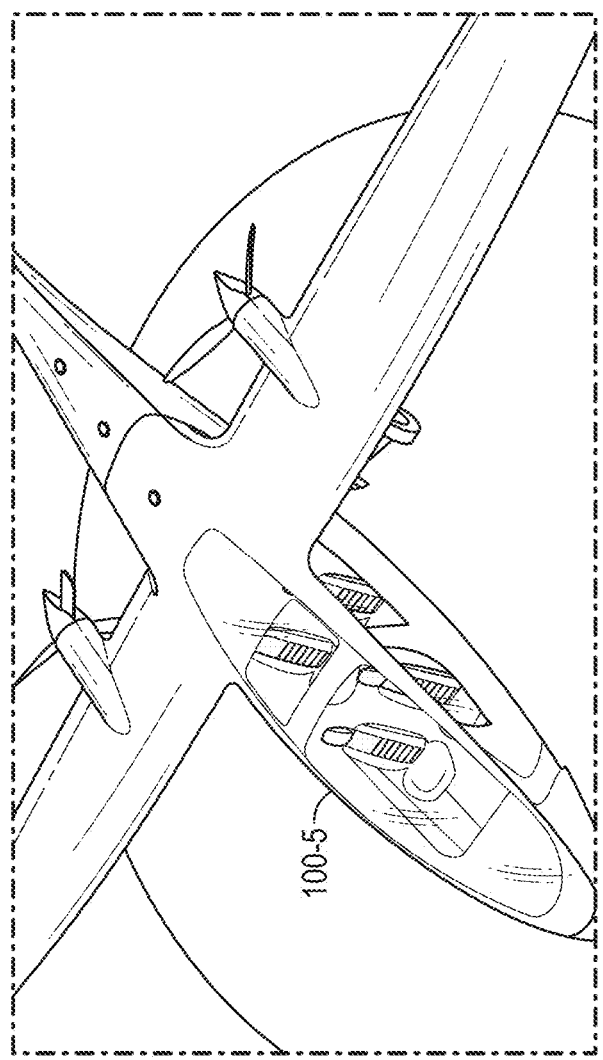
Figure 1H:
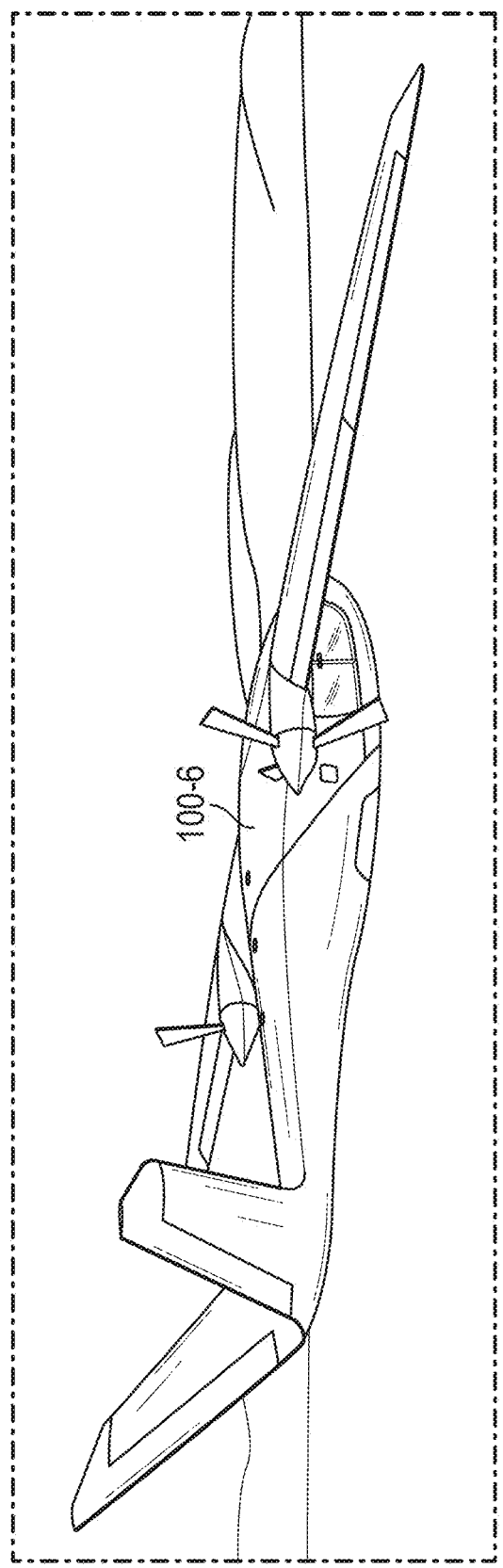
Figure 11:
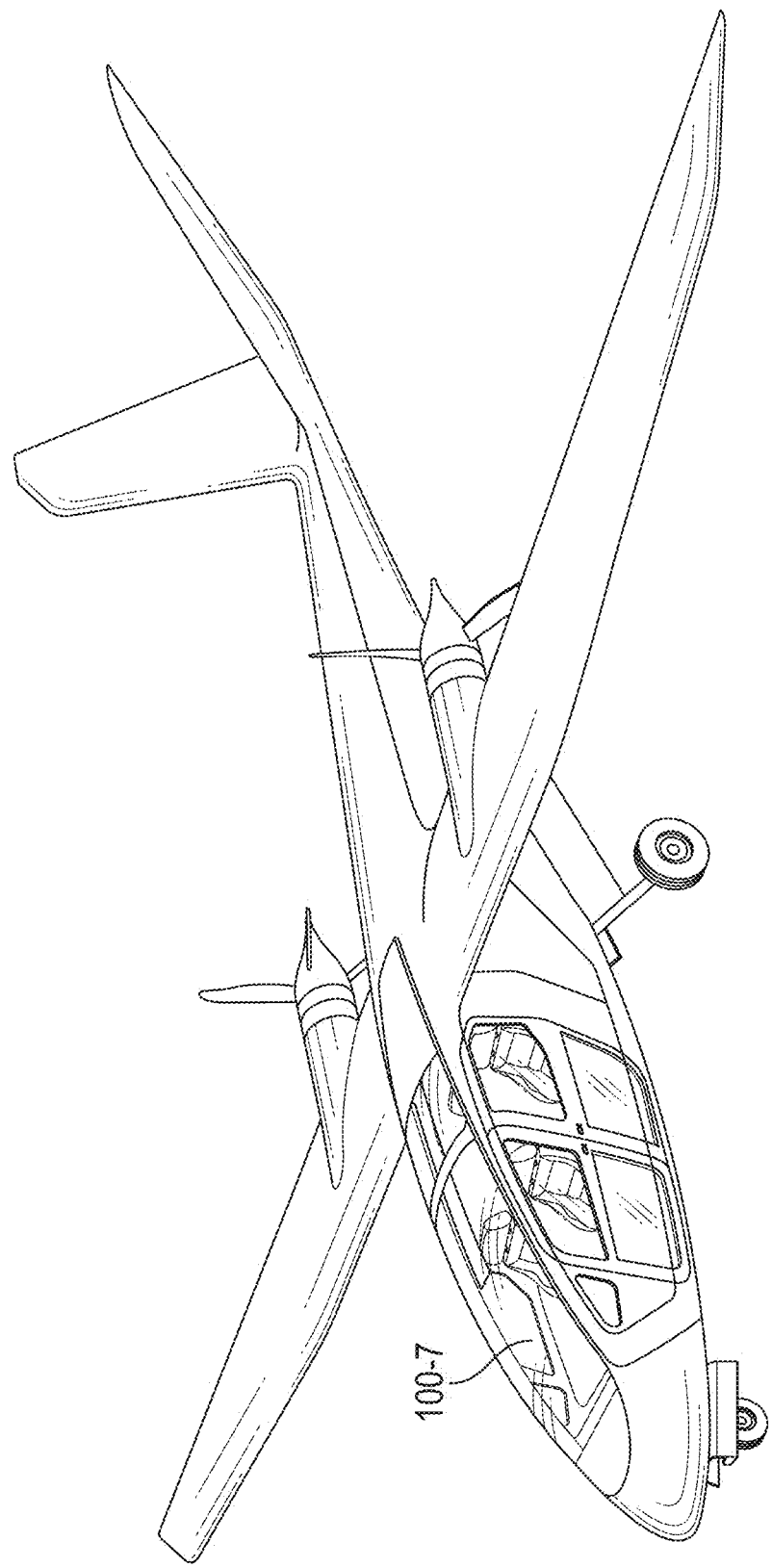

In some implementations, cabin doors 124 may be included on both sides of the fuselage. In other implementations, cabin doors 124 may be located on a single side of the fuselage. In some implementations (e.g., see FIG. 1F), the cabin doors 124-2 may be configured to open in an upward swinging direction. For example, the doors 124 may be hinged near the top of the door opening (e.g., near the top of the fuselage) such that the doors swing outward to a resting position that is parallel to the ground/wing or past parallel to the ground/wing. As illustrated in FIG. 1F, when the doors 124-2 are located forward of the wing, the doors 124-2 may raise beyond the plane of the wing such that the doors (e.g., portions of doors opposite to the hinges) are above the top surface of the wing. Although the cabin doors 124 may swing upward, in some implementations, doors may swing open in other configurations. For example, one or more doors may swing outward toward the nose of the aircraft. In another example, one or more doors may swing outward toward the tail of the aircraft.

The number of doors and passenger openings may vary, depending on the implementation. In some implementations, a single door may provide a single opening into the cabin. In some implementations, a single door may provide multiple entries into the cabin (e.g., see FIG. 1F). The cabin doors may include cabin door mechanisms, such as one or more hinges per door, opening/closing assist mechanisms such as shocks or springs, interior/exterior passenger door opening and closing mechanisms, and/or other mechanisms.

In some implementations, the cabin 108 may be configured for use without a pilot. In this implementation, typical pilot controls and displays may be absent, such as a flight yoke, control pedals, power levers, and flight displays (e.g., a primary flight display). In some implementations, passenger input/output (I/O) devices 1018 may be included, such as passenger displays, passenger controls, passenger communication devices, and/or other devices described herein (e.g., device chargers). In some implementations, the cabin may include safety devices, such as flotation devices or other safety devices.

The one or more passenger displays (e.g., cabin displays 300, 304-1, 304-2) may display a variety of information to the passengers. For example, passenger displays may display a set of destination locations for choosing. Passenger displays may also display a map that indicates a flight plan for the aircraft, such as a departure location (e.g., a current location), route to a destination location (e.g., including one or more intermediate points, such as landmarks), and a destination location.

Figure 3A:
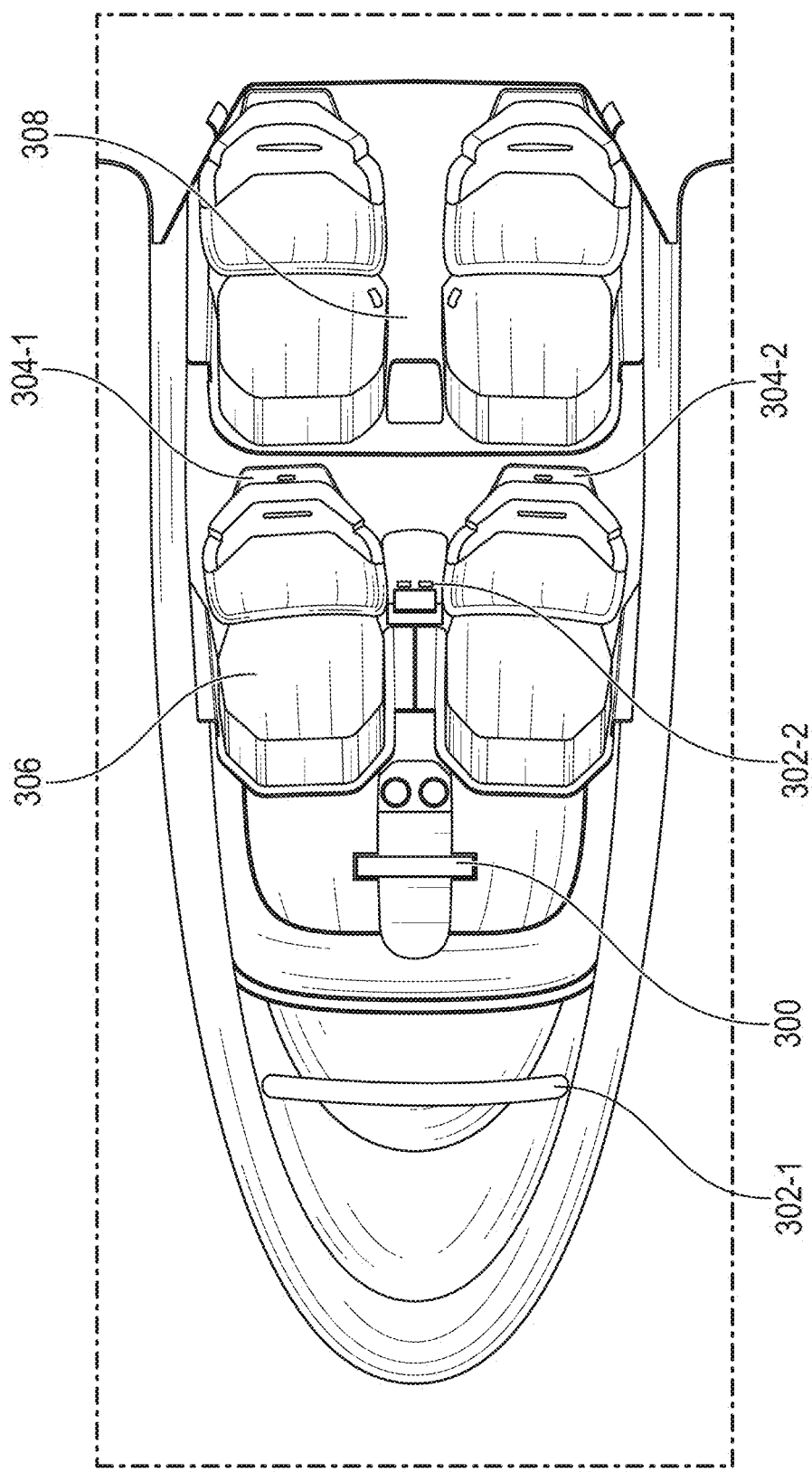
FIGS. 3A-3C illustrate example cabin configurations and features of an electric autonomous aircraft.

Passenger controls may include one or more touchscreens (e.g., on display 300) and/or other manual buttons that may receive passenger input. Example passenger input may include flight plan data that sets a flight plan, such as a destination location and/or a list of intermediate points between the departure location and the destination location. In some implementations, the aircraft 100 may include an air conditioning (AC) and/or heating system that passengers may control. For example, FIG. 3A illustrates locations for front and rear heating/AC outlets 302-1, 302-2. In some implementations, the aircraft 100 may include an aircraft parachute system (e.g., a parachute in a storage compartment, parachute deployment controls, etc.). In these implementations, the cabin 108 may include parachute deployment controls on a touchscreen. Additionally, or alternatively, the cabin 108 may include manual parachute deployment controls (e.g., hidden under a removable parachute deployment panel).

Passenger communication devices may include one or more microphones and/or speakers. Passenger communication devices may also include electronics that connect to passenger communication devices, such as Bluetooth transceivers that connect to passenger mobile devices.

Figure 3B:
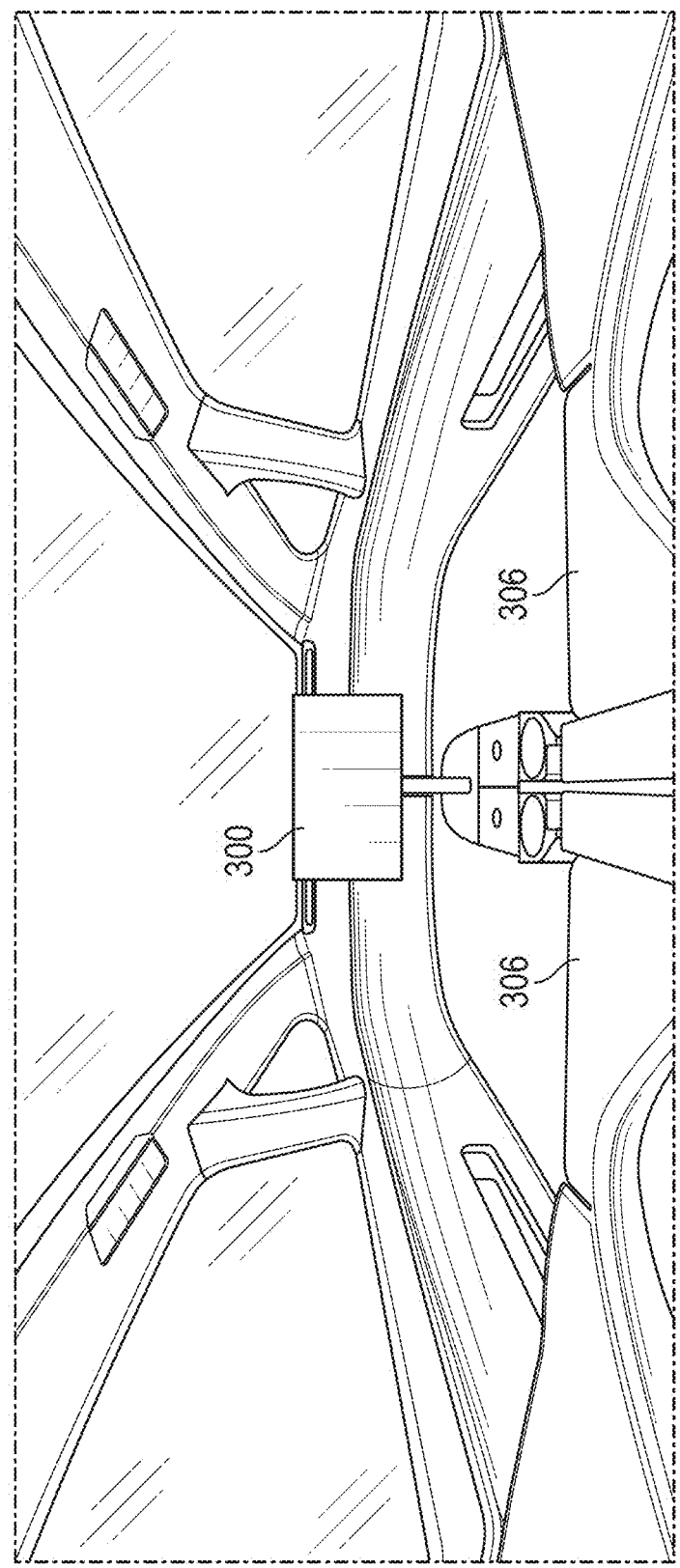
Figure 3C:
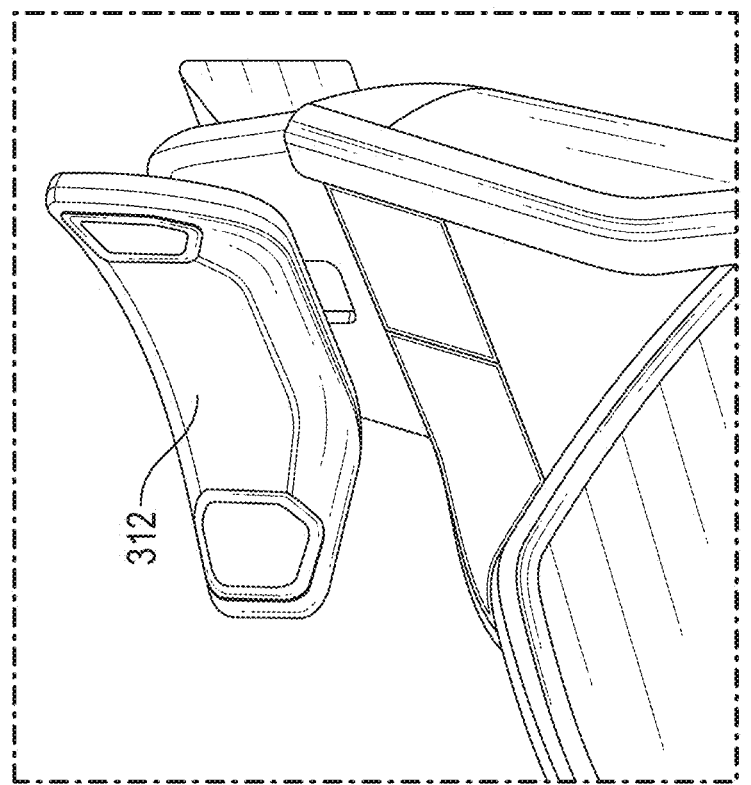
Figure 3C:
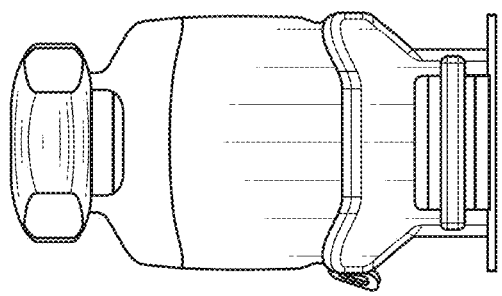
Figure 3C:
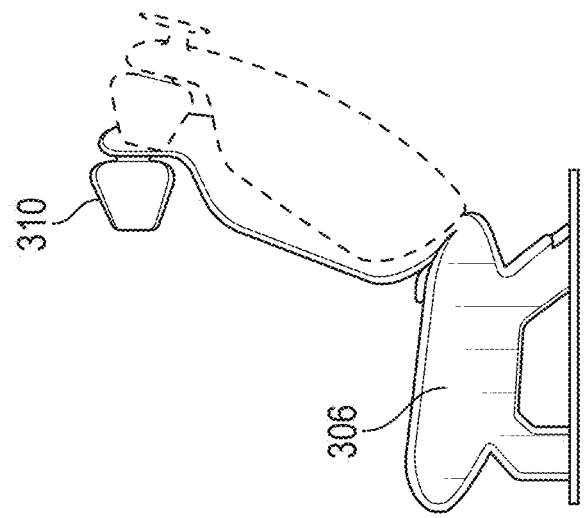

FIGS. 3A-3C illustrate example cabin configurations and features. FIGS. 3A-3B illustrate a cabin that includes 4 passenger seats 306, a front cabin display 300, and 2 rear cabin displays 304-1, 304-2. The cabin in FIGS. 3A-3B also includes front and rear heating/AC outlets 302-1, 302-2 and a rear folding arm rest 308. In some implementations, the cabin may include console storage on the floor and/or in consoles between seats 306. In some implementations, the cabin may include wired/wireless chargers for passenger devices (e.g., passenger cell phones, tablets, and/or laptops). FIG. 3C illustrates example passenger seats 306 and example seat features (e.g., a reclining back 310 and a noise canceling headrest 312).

In some implementations, the aircraft may be operated by a pilot via the interfaces provided to passengers (e.g., the cabin displays). In some implementations, a cabin may include other pilot controls and pilot displays. Example pilot controls and displays may include, but are not limited to, a flight yoke, control pedals, power levers, and a primary flight display. As described herein, in some implementations, a ground control station (GCS) may monitor and/or control the aircraft 100. In these implementations, the GCS may include pilot controls and displays for controlling the aircraft 100. A single GCS including one or more human operators may also control additional aircraft.

The cabin may include a plurality of windows (e.g., polyacrylic windows). Cabin windows may include one or more windows over top of the passenger seats in the cabin. For example, a windscreen window 128 and a ceiling window 126 over the passenger seats are illustrated in FIG. 1C. Windows may also include door windows 130. For example, FIG. 1F illustrates doors 124-2 including 4 windows. As another example, FIG. 1C illustrates doors 124-1 that each include one window. Additional example windows may include additional side windows 132 that are behind the nose portion 102 and in front of the door windows (e.g., see FIG. 1C).

Figure 4A:
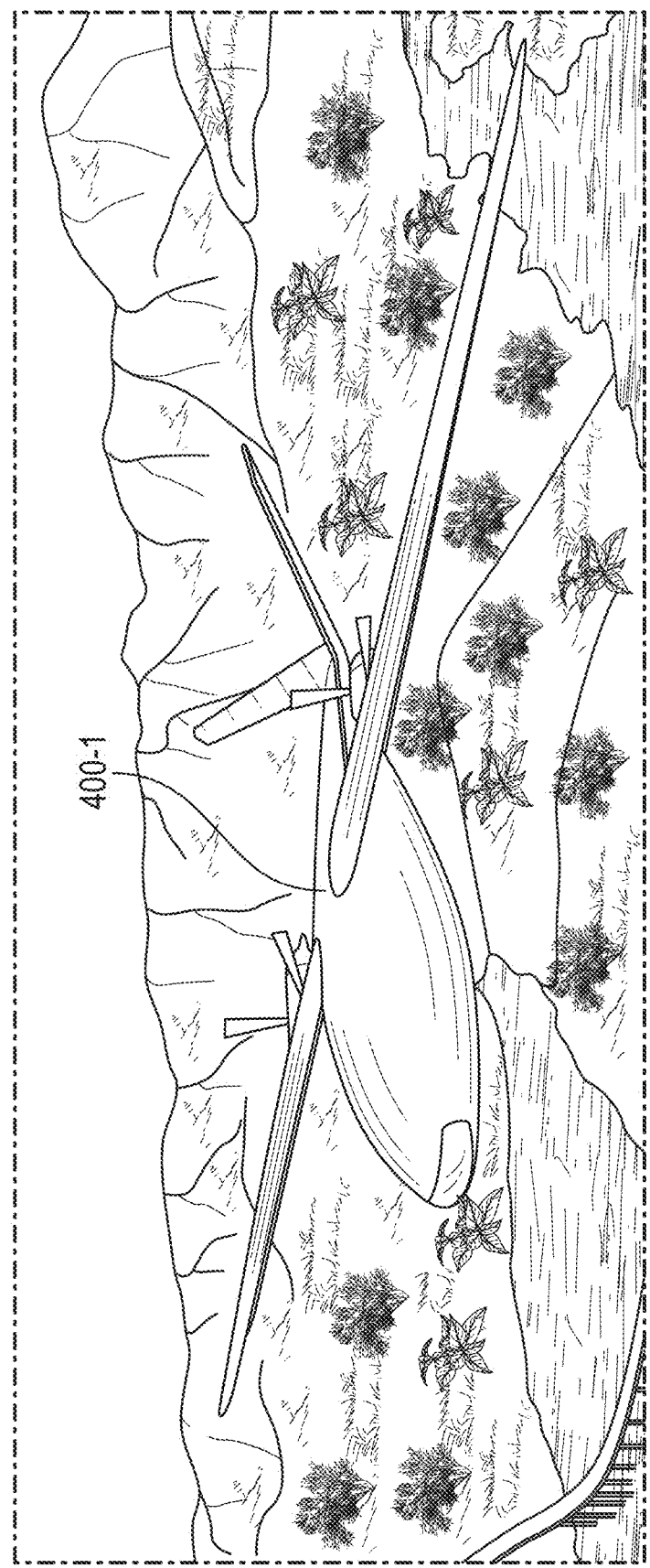
Figure 4B:
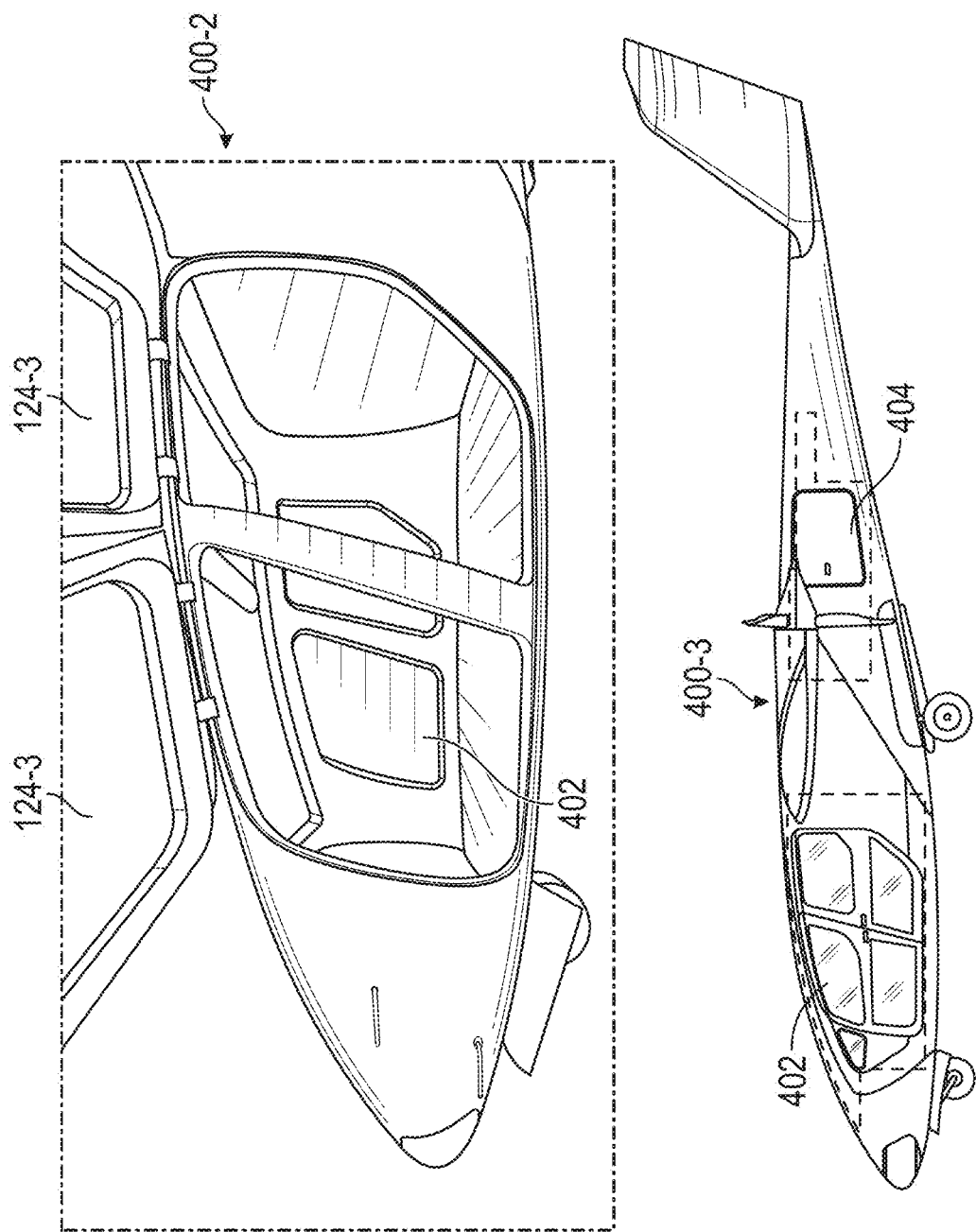

In some implementations, the aircraft may be configured as a cargo aircraft 400 (e.g., see FIGS. 4A-4C). For example, the aircraft 400 may include one or more cargo holds 402, 404 (e.g., instead of a passenger cabin 108). In cargo aircraft, the cabin portion of the fuselage may be referred to as a "cargo portion" of the fuselage or a "main cargo portion" of the fuselage. Cargo holds 402, 404 may be accessed via openings behind cargo doors (e.g., similar to passenger entry areas behind passenger doors). Cargo holds 402, 404 may include a variety of cargo hold features. Example cargo hold features may include markings associated with loading cargo, such as markings that define zones. Example markings may include ink/paint, tape, stickers, stampings, placards, and/or other markings. In some implementations, the cargo hold(s) may include markings (e.g., placards) that indicate a maximum weight value and/or maximum weight per unit area value. In some implementations, the cargo hold(s) may include dividers or other devices for securing cargo, such as tie downs and/or netting. In the cargo aircraft implementation, the cabin portion may be referred to as a cargo portion of the fuselage that includes a "main cargo hold 402" or a "first cargo hold." A cargo aircraft 400 may include one or more additional cargo portions, such as a second cargo portion (e.g., an aft cargo hold 404) in the aft portion of the fuselage 116 (e.g., see FIG. 4B).

In some implementations, the cargo aircraft 400 may include the same door configuration as the passenger aircraft 100. In some implementations, the cargo aircraft 400 may include a different door configuration than the passenger aircraft 100. For example, the cargo aircraft 400 may include the same number and arrangement of doors (e.g., doors per side, hinging mechanisms, etc.) or a different number and arrangement of doors. In some implementations, the cargo hold(s) may be manufactured for the durable loading and transport of cargo. For example, windows may be absent from the cargo hold. In some implementations, as illustrated in FIG. 4C, the cargo hold(s) 402, 404 may be configured to handle volumes of cargo that may be similar to that carried by a delivery van. For example, the main cargo hold 402 and the aft cargo 404 hold may be configured to hold approximately 130 cubic ft and 45 cubic feet of cargo, respectively.

The fuselage may include a battery bay located aft of the cabin 108. For example, the battery bay may be located in the fuselage under the wing 112. The battery bay may be separated from the cabin 108 by a bulkhead. In some implementations, the battery bay may extend aft of the wing 112 and/or forward of the wing 112. The battery bay may include a battery assembly 606 (e.g., see FIG. 6D). The battery assembly may include batteries, battery racks, battery management modules, power wires/cables, and other devices described herein. The aircraft may be designed so that the batteries, racks, wires/cables, and other devices under the wing 112 provide a large mass that maintains the aircraft center of gravity (CG) under/near the wing 112. For example, the aircraft 100 may be designed so that adding or removing passengers/cargo within a specified weight limit (e.g., under 1000 lbs) may not move the CG out of a specified CG envelope.

In some implementations, a portion of the battery assembly (e.g., batteries) may be stored in an aerodynamically shaped portion of the fuselage, such as a bulge (not illustrated) in the fuselage. In some implementations, a portion of the battery assembly may be stored externally to the fuselage in an aerodynamically shaped container (e.g., attached to the fuselage or in another location). For example, a portion of the battery assembly external to the fuselage may be covered by an aerodynamic cover. Additional batteries housed in a fuselage bulge or external aerodynamic container may overcome losses in aerodynamics due to increase drag introduced by the bulge or external container. In some implementations, portions of the battery assembly may be stored within the wing.

The wing assembly includes two electric motors (e.g., inside motor housings 138) that are powered by the aircraft batteries. A propeller 134 is attached to each motor. The propellers 134 face rearward (e.g., toward the tail) in a pusher configuration. Rearward facing motors may provide additional passenger safety in the case of propeller blade separation. High-mounted motors/propellers may also reduce exposure to pebbles from landing gear. The propellers may also include pressure-recovery spinners for reduced spinner pressure drag. A pusher configuration and low-frontal area installation of the powerplant may improve the wing's lift in the region and lower its drag, which may make the wing more efficient.

Figure 7:
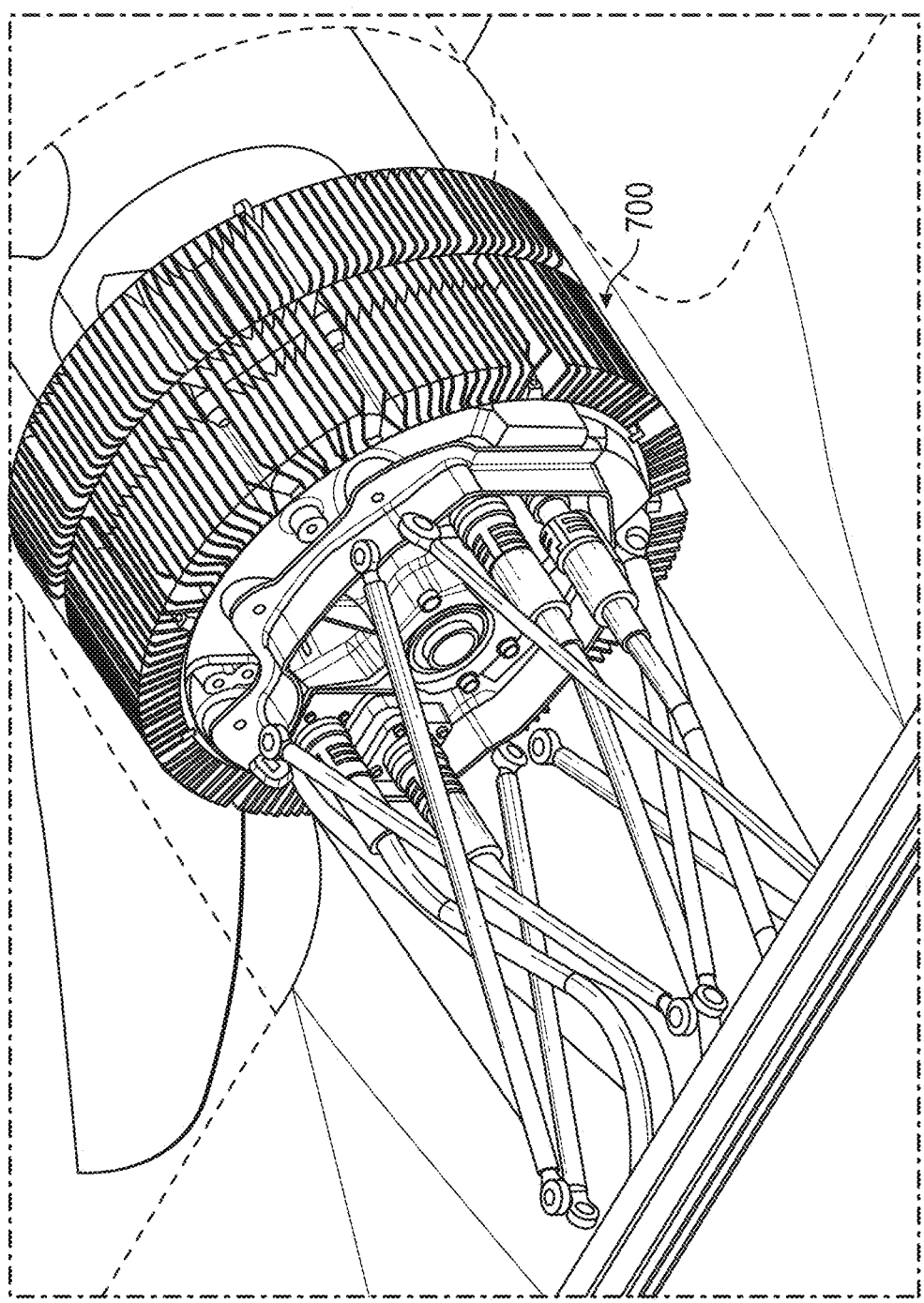
FIG. 7 illustrates an example motor mounted into a wing.

The wing assembly includes motor mounts. In some implementations, the motor mounts may be integrated into the wing (e.g., into the wing skin) and/or attached to the wing. In some implementations, one or more fairings 136 (nacelles) may be installed to improve aerodynamic performance. In some implementations, nacelles may include inlets/outlets for cooling air. In a specific example, a motor mount may be integrated into the top portion of the wing. In this specific example, a lower nacelle may be removable for access to the motor and power cables for maintenance and motor replacement. FIG. 7 illustrates an example motor mounted into a wing (e.g., using a truss structure).

The wing assembly may also include control surfaces. For example, the wing assembly may include flaps 140 and ailerons 142. In some implementations, the ailerons 142 may be drooped ailerons that may increase lift capability for takeoff and landing, which may shorten takeoff distance. In some implementations, the aircraft 100 may include split control surfaces (e.g., split ailerons) and/or multiple actuators. In the case control surfaces are split (e.g., split ailerons), the aircraft 100 can independently control (e.g., deflect) the split control surfaces. For example, when using split ailerons (e.g., spanwise split into multiple ailerons), the actuators may deflect each of the ailerons to different extents.

An aft portion 116 of the fuselage extends from the underwing portion 122 to the aircraft tail assembly 144. The aft portion 116 of the fuselage may also be referred to as the "rear portion" of the fuselage, "rear fuselage," or the "tail boom." The aft portion 116 may include a rear cargo hold 404 (e.g., a luggage compartment) that is accessible via a rear cargo door 146.

The aircraft includes a tail assembly 144. The tail assembly 144 includes a V-tail and tail control surfaces 148. The illustrated tail control surfaces 148 may be referred to as ruddervators. The V-tails may be attached in a variety of ways. In some implementations, the V-tails may be integral to the fuselage. For example, the fuselage may be fabricated in two halves in a composite mold and the tail surfaces may be molded as part of the fuselage. In other implementations, the V-tails may be attached to the fuselage in another manner. For example, each of the V-tails may be inserted into V-tail attachment locations on the fuselage (e.g., inserted through slots in the fuselage) and bonded to the fuselage structure. In some implementations, a V-tail may simplify manufacturability of the stabilizing surfaces and also reduce interference drag. In some implementations, the aircraft may include other types of tail assemblies, such as a T-tail configuration or Y-tail configuration.

In some implementations, the fuselage may include a parachute storage and deployment compartment at 502 (hereinafter "parachute storage compartment"). The parachute storage compartment may be located aft of the wing structure (e.g., behind the aft wing spar 520) (e.g., see 502 in FIG. 5D). The exterior of the fuselage may include a panel, or other cover, that is opened when the parachute is deployed from the parachute storage compartment 502. In some implementations, the outside of the compartment may be a continuous surface of the external fuselage geometry. In some implementations, the portion of the fuselage over the parachute does not bulge from the fuselage or otherwise disrupt the tadpole fuselage shape. In some implementations, the parachute may be a ballistic parachute, such as a ballistic parachute provided by BRS Aerospace of St. Paul, Minnesota. The parachute may be deployed automatically by the aircraft control system and/or manually by a cabin occupant. The V-tail configuration may be beneficial relative to other tail designs during deployment of the parachute. In some implementations, the parachute deployment system may operate using control laws that control the airspeed and powerplant to ensure ideal deployment conditions.

The aircraft includes retractable nose landing gear 150 and retractable rear landing gear 152. The nose landing gear 150 may be centered in the fuselage. In some implementations, avionics may be located on either side of the nose landing gear 150 when the nose landing gear 150 is in the retracted position. The rear landing gear 152 folds aft into the fuselage. Although the rear landing gear 152 may fold aft into the fuselage in the figures, in other implementations, the rear landing gear may retract forward into the fuselage. The nose landing gear 150 may also be configured to retract forward or aft into the fuselage, depending on the configuration of the aircraft. The landing gear are covered by aerodynamic landing gear doors when retracted so that the landing gear is not exposed to the airstream. The closed landing gear doors form a low drag surface when closed over the retracted landing gear. Note that the fuselage does not include a landing gear housing bulge, or other external landing gear housing geometry, that disrupts the tadpole shape of the fuselage.

The illustrated aircraft includes a fuselage that expands in volume from the nose portion 102 throughout the cabin portion 120 in order to provide room for passengers. The fuselage may constrict in the underwing portion 122 where batteries are stored. The fuselage further constricts in the aft portion 116 leading to the tail 144. In some implementations, the fuselage form may be referred to as a "tadpole structure."

In some implementations, the aircraft 100 may be designed based on desired flight distance and desired flight duration considerations. In some implementations, the electric propulsion system and target range may call for an aircraft configuration having extremely low drag. This may be achieved utilizing advanced aerodynamics that feature a low drag wing planform with mission designed natural laminar flow airfoils, smooth surfaces, and blended fairings. In some implementations, the aircraft may be configured for regional mobility (e.g., feeder routes), such as routes that are less than 200 nmi. In some implementations, the aircraft may implement a low velocity design for low-speed aerodynamics (e.g., for 120-150 KTAS cruise speed).

In some implementations, the aircraft 100 may be designed based on payload and center of gravity considerations. For example, the aircraft may be configured for passenger payloads sufficient to carry multiple passengers. In a specific example, the aircraft may be configured for payloads of up to approximately 1000 lbs (e.g., for four passengers). In some implementations, the aircraft may be designed such that a maximum payload weight for passengers and/or cargo (e.g., 1000 lbs) is only a portion (e.g., 15%) of the gross aircraft weight. In this example, the aircraft may be relatively insensitive to the weight in the cabin (or main cargo hold).

Figure 2A:
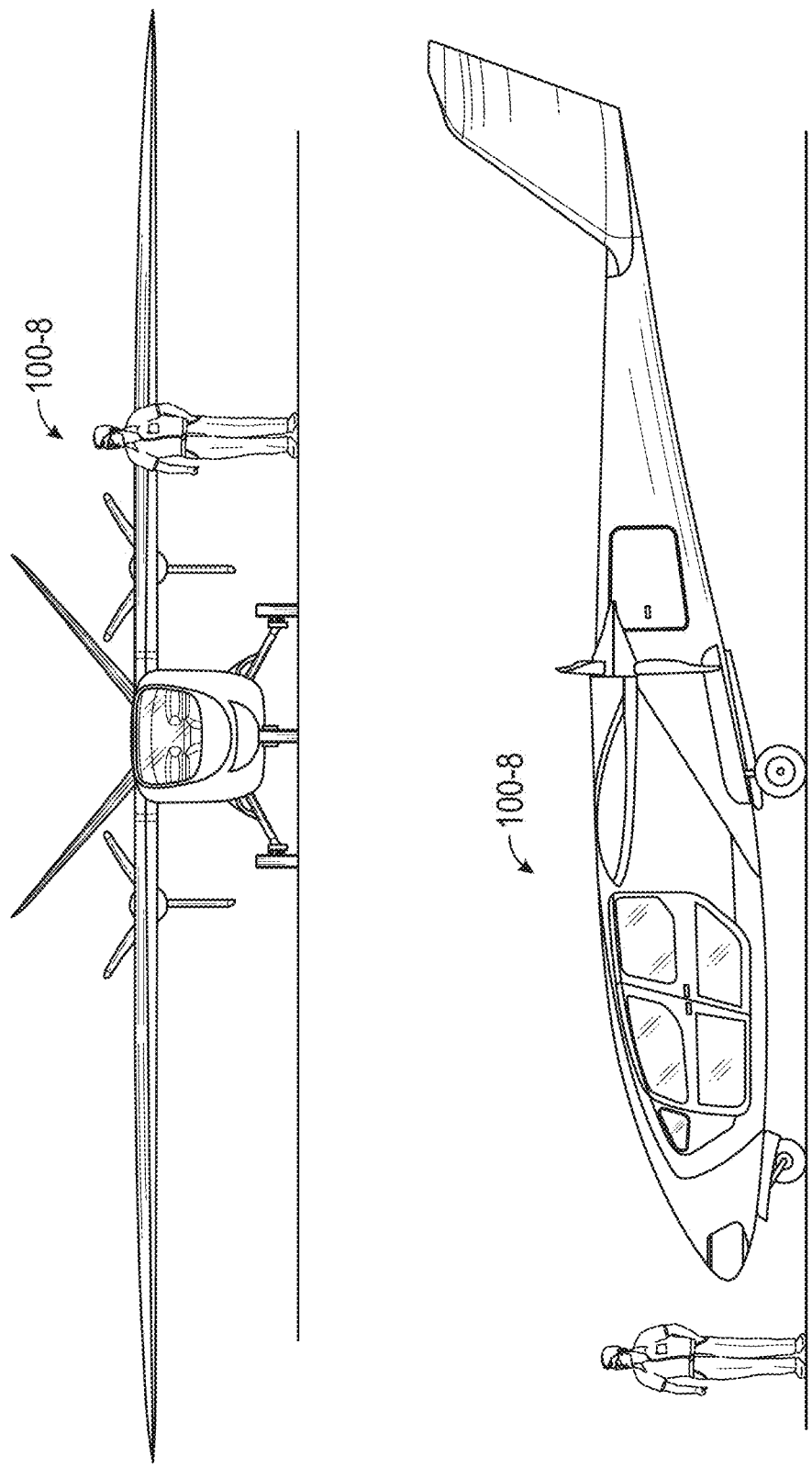
FIGS. 2A-2B illustrate example dimensions of an electric autonomous aircraft.
Figure 2B:
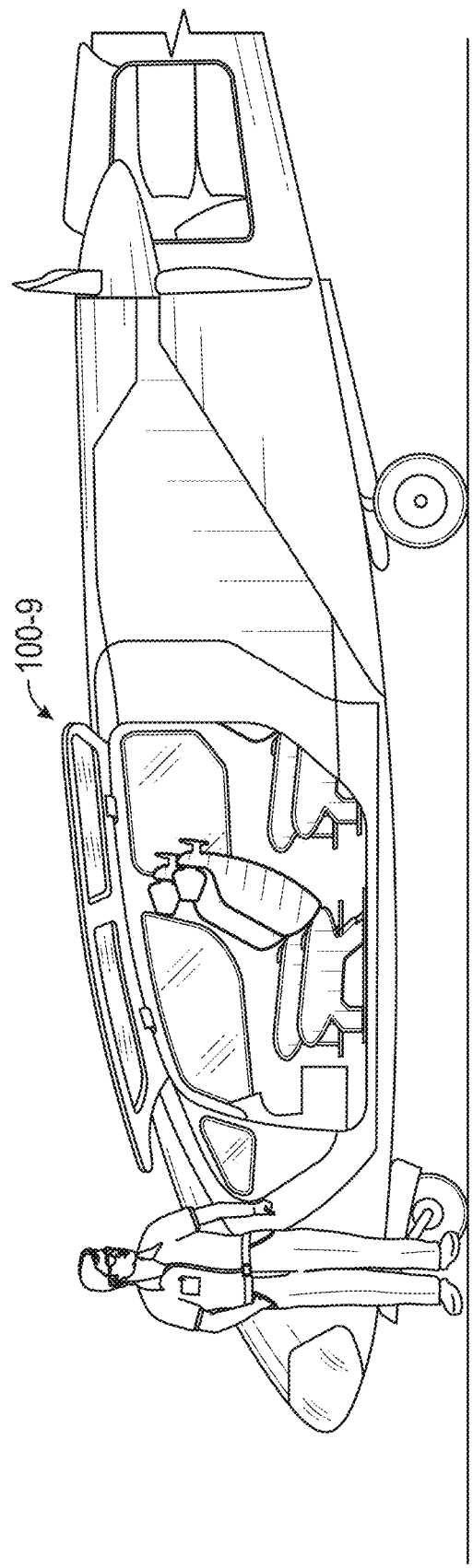

The aircraft 100 may provide superior passenger accessibility relative to other aircraft. For example, the aircraft cabin and doors (e.g., upswinging doors) may provide a low entry height so that entry and exit is comfortable for all passengers. Additionally, the position of the doors forward of the wing and the rear-facing pusher propellers may provide unobstructed passenger entry and exit. In a cargo configuration, the accessibility and low load height may also provide a superior cargo loading experience. Furthermore, the insensitivity to cargo load weight (e.g., under the maximum payload) may expedite cargo loading by eliminating weighing delays. FIG. 2B illustrates an example entry height of 420 mm, although other entry heights (e.g., lower or higher heights) may be provided by the aircraft design. In cargo aircraft, the floor loading height may be similar to the entry height illustrated in FIG. 2B. The example entry/loading height illustrated in the figures may be similar to that of a car or sport utility vehicle (SUV). Although low entry/loading heights are illustrated, entry/loading heights may be raised in larger versions of the passenger/cargo aircraft. The example dimensions provided in FIGS. 2A-2B are only example dimensions. As such, other aircraft with other dimensions may be manufactured.

The aircraft 100 may provide superior passenger comfort relative to other aircraft. The cabin windows may provide passengers with a large field of view relative to other aircraft. Large passenger seats and the passenger seat configuration in the cabin may provide for a comfortable seating surface with ample elbow room, head room, and leg room for all passengers, as well as additional room ahead of the front passengers while seated. The large field of view and accommodating passenger seats may enhance the flight experience and limit passenger claustrophobia. The high wing placement behind the passenger, as well as the rear-facing motors, may also provide a large passenger field of view as well as a comfortable and quiet flying experience.

The autonomous aircraft may eliminate onboard pilots and crew, which may save on costs and allow additional flights with additional route flexibility. A single remote ground crew (e.g., pilot and/or other crew) may monitor and control multiple autonomous aircraft from the ground, which may further reduce typical pilot and crew costs.

FIGS. 5A-10 illustrate example internal structure and components of the aircraft. The aircraft structure may include a variety of structural components, such as frames, longerons, bulkheads, and other structural components illustrated in FIGS. 5A-9. The various structural components may form the aircraft features described herein, such as an avionics bay, passenger/cargo cabin, battery bay, and rear cargo bay. Some illustrated structural components are labeled in the figures. Labels and callouts may be absent from other structural components in order to simplify the figures (e.g., in order to reduce redundant labeling and enhance viewing of the structural components).

Figure 5A:
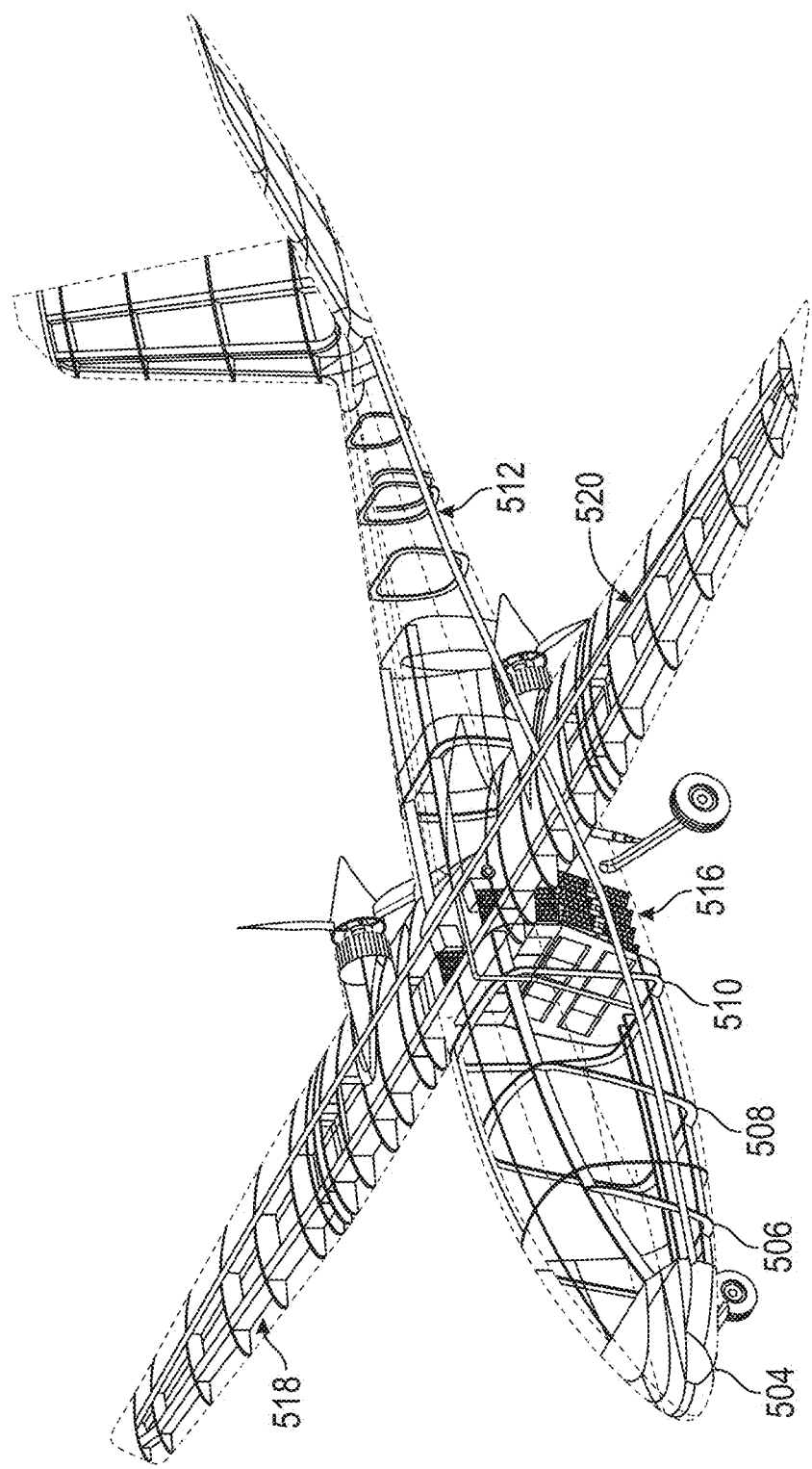
FIGS. 5A-5D illustrate example aircraft internal structures.

FIGS. 5A-5D illustrate example aircraft internal structures. For example, the aircraft structure includes frame components (e.g., frames, longerons, and bulkheads). FIG. 5A illustrates example nose structures 504, such as a landing gear support structure and an avionics bay support structure. FIG. 5A also illustrates example cabin support structures, such as an A pillar 506, a B pillar 508, and a C pillar 510. Wiring harnesses 512 (e.g., white lines) routed through the fuselage and wing are also illustrated in FIG. 5A.

Figure 5B:
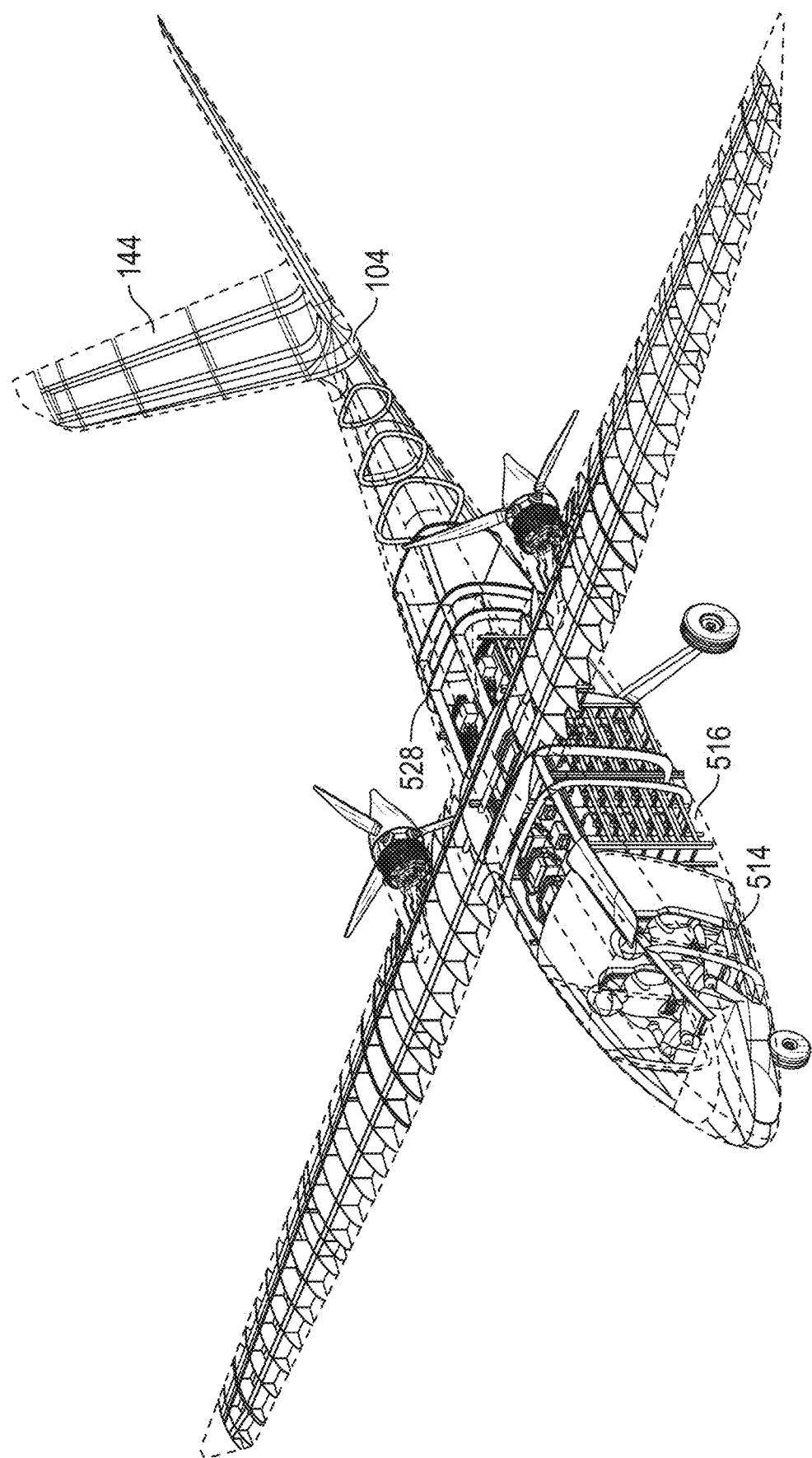
Figure 5C:
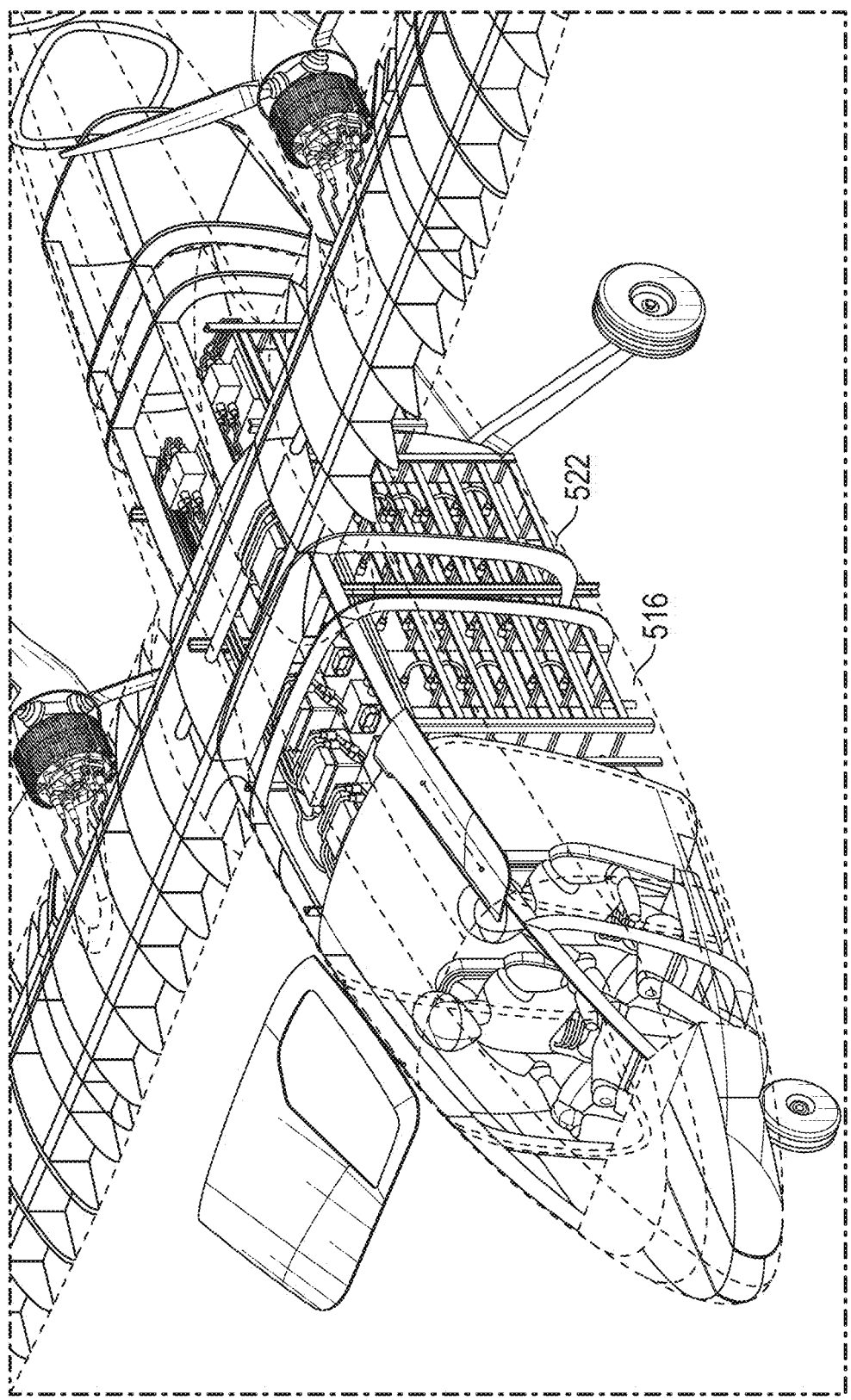
Figure 5D:
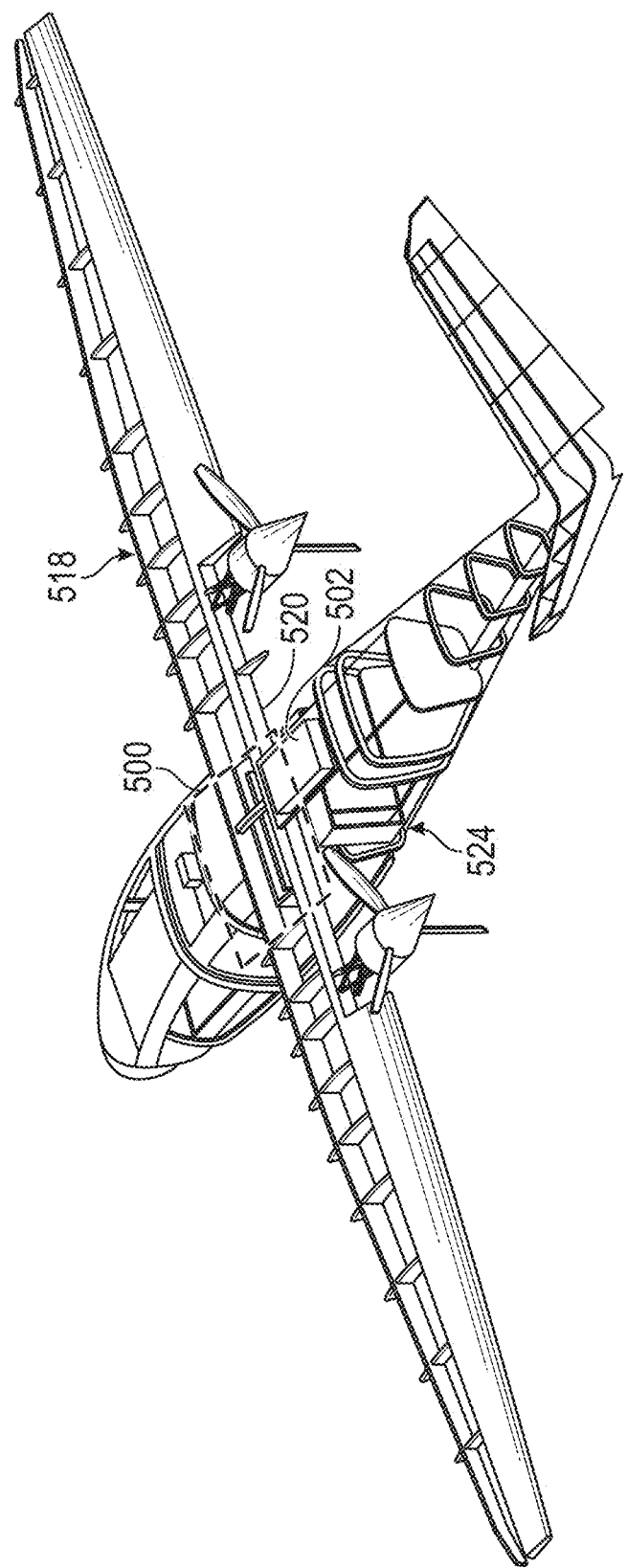

FIGS. 5B-5C illustrate an example 2 passenger aircraft (e.g., 2 passenger cabin 514) with single upswinging doors on each side of the fuselage. FIGS. 5B-5C also illustrate an example battery assembly 516 in a battery bay located forward, under, and aft of the wing. The aircraft in FIGS. 5A, 5B, and 5D include a tail attachment region 104 at which the tail assembly 144 may be attached to the fuselage.

FIGS. 5A-5D illustrate example internal wing structures. The illustrated aircraft include a cantilever wing design including one or more beams (i.e., spars). In the figures, the spars (e.g., a forward spar 518 and an aft spar 520) run along the span of the wing from tip to tip. The spars may be attached to the fuselage in a wing attachment region 500 of the fuselage. The portion of the wing fixed to the fuselage may be referred to as the root of the wing. The portion of the wing that is distal from the fuselage may be referred to as the tip of the wing. The aft spar 520 may be a straight single piece. A straight aft spar may improve effectiveness, operation, and manufacturing of flaps and ailerons. A straight aft spar may also improve the aerodynamic effectiveness of the flaps and ailerons. The forward spar 518 may be tapered toward the wing tips. The illustrated wing planform may be a low drag geometry that provides aerodynamic efficiency. Example wing planforms may include, but are not limited to, a Schuemann-style wing, a Dornier Do-228, a Do-328, or other low-drag geometries. In some cases, a Schuemann-style wing may reduce bending moments, helping reduce its weight. A high-efficiency Schuemann-style wing may also reduce lift-inducing drag in cruise and offer roll-stability at stall. Additional/alternative wing configurations and internal structures may be implemented on the aircraft other than those illustrated herein. The wing may also include different wingtip features/devices or increased aspect ratio other than illustrated herein.

The fuselage may include main frame portions 522, 524 that attach to the wing spars 518, 520. For example, the fuselage may have a forward main frame 522 and a rear main frame 524 that attach to the forward spar 518 and the aft spar 520, respectively. The forward and/or rear main frames 522, 524 may also be used as attachment points for the rear landing gear. The forward and rear main frames 522, 524 may also form the battery bay and serve as support structures for the battery assembly 516. Additionally, the rear main frame 524 may serve as a parachute attachment region 528 for the parachute system (e.g., a parachute storage compartment 502). As such, the forward and rear main frames 522, 524 may serve multiple purposes, thereby simplifying the aircraft structure. In some cases, the forward main frame 522 and the rear main frame 524 may be referred to as a forward bulkhead and a rear bulkhead, respectively.

Figure 6C:
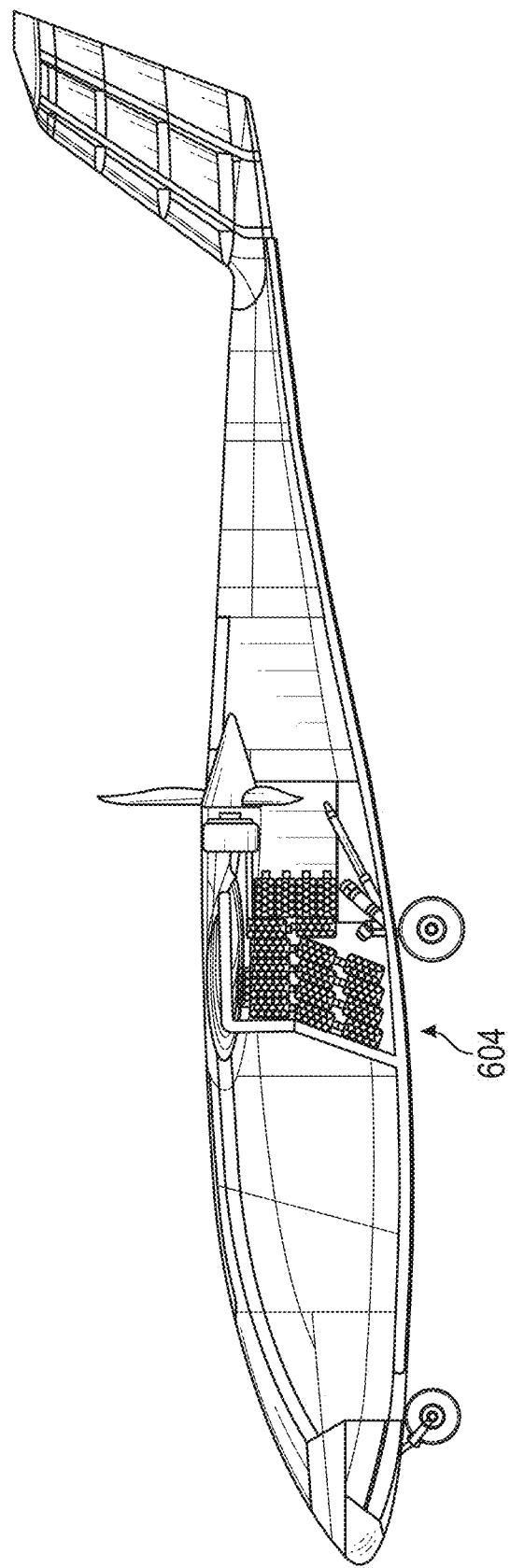

FIGS. 6A-6C illustrate example battery assembly locations within the aircraft battery bay. In FIG. 6A, the battery bay including the battery assembly 600 starts under the underwing portion of the fuselage and extends towards the tail region of the aircraft. In FIG. 6B, the battery bay including the battery assembly 602 starts forward of the underwing portion of the fuselage and extends to a region of the rear portion of the fuselage aft of the wing. In FIG. 6C, the battery bay including the battery assembly 604 is located substantially within the underwing portion of the fuselage.

Figure 6D:
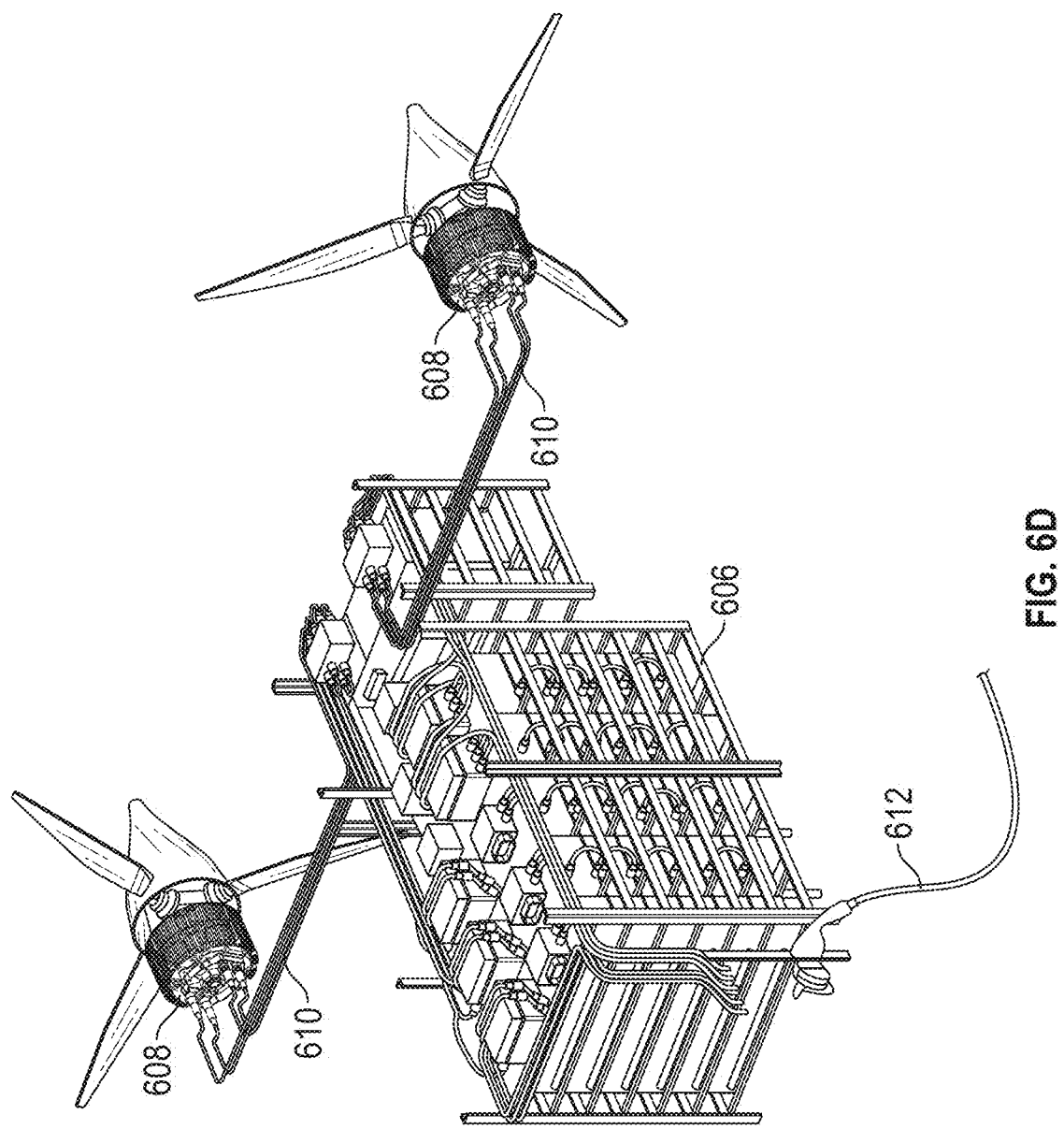
FIG. 6D illustrates an example battery assembly.

FIG. 6D illustrates an example battery assembly 606. A battery assembly 606 may include batteries (e.g., battery cells and/or battery packs), battery support structures (e.g., racks), one or more battery management system components, battery cooling and venting components, terminals, and wiring (e.g., wires, cables, wiring harnesses, etc.). A battery management system may monitor the batteries (e.g., voltage, temperature, coolant flow for liquid cooled batteries, current, battery balancing, etc.), control recharging, calculate values for the system (e.g., state of charge, depth of discharge, state of health, etc.), provide battery protection (e.g., over charging, over discharging, etc.), and provide additional battery management features. FIG. 6D also illustrates example motors 608 attached to the batteries using cables 610. FIG. 6D also illustrates an attached charging cable 612 that may charge the batteries.

Figure 8A:
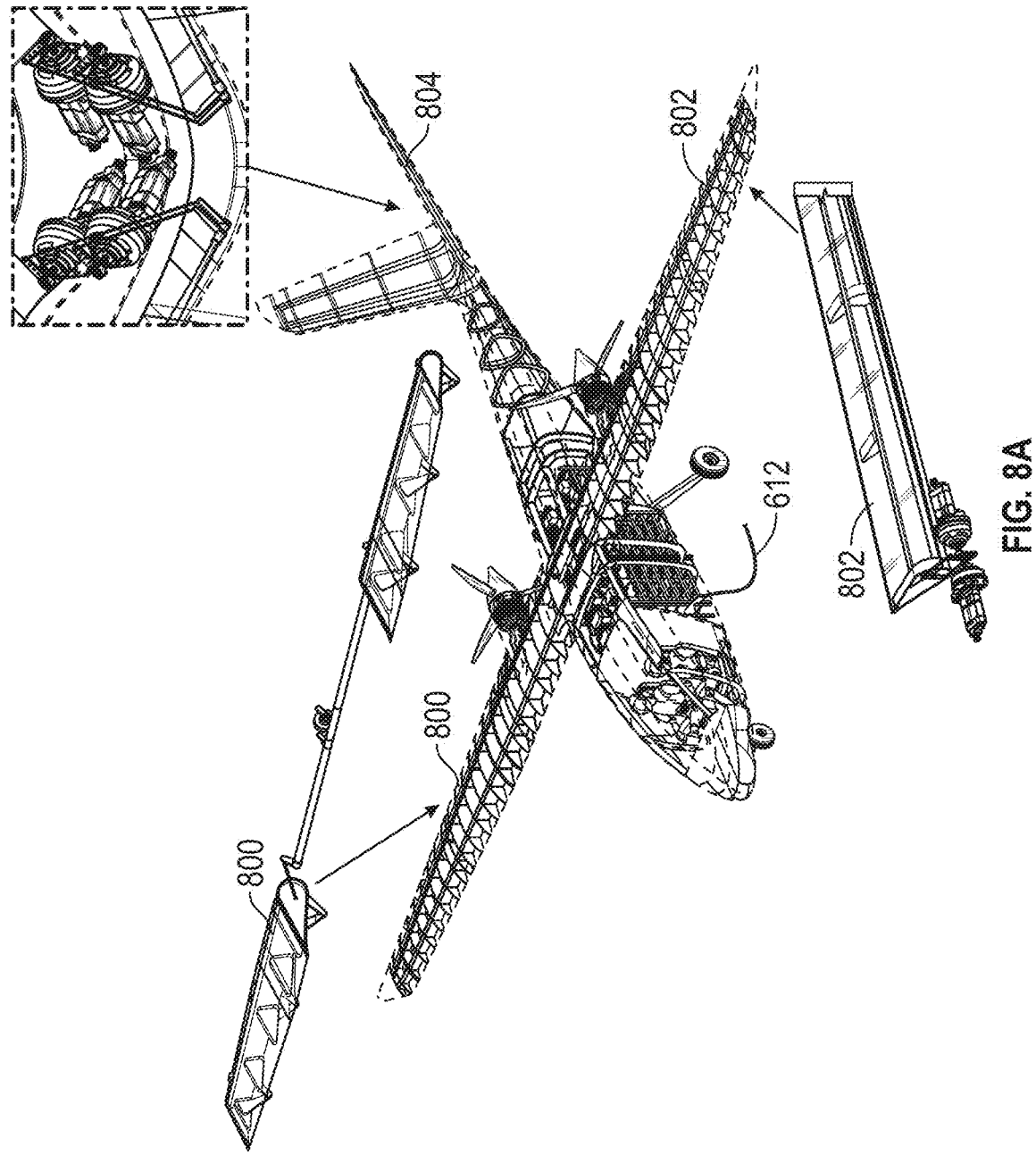
FIGS. 8A-8D illustrate example actuators, linkages, and control surfaces.
Figure 8B:
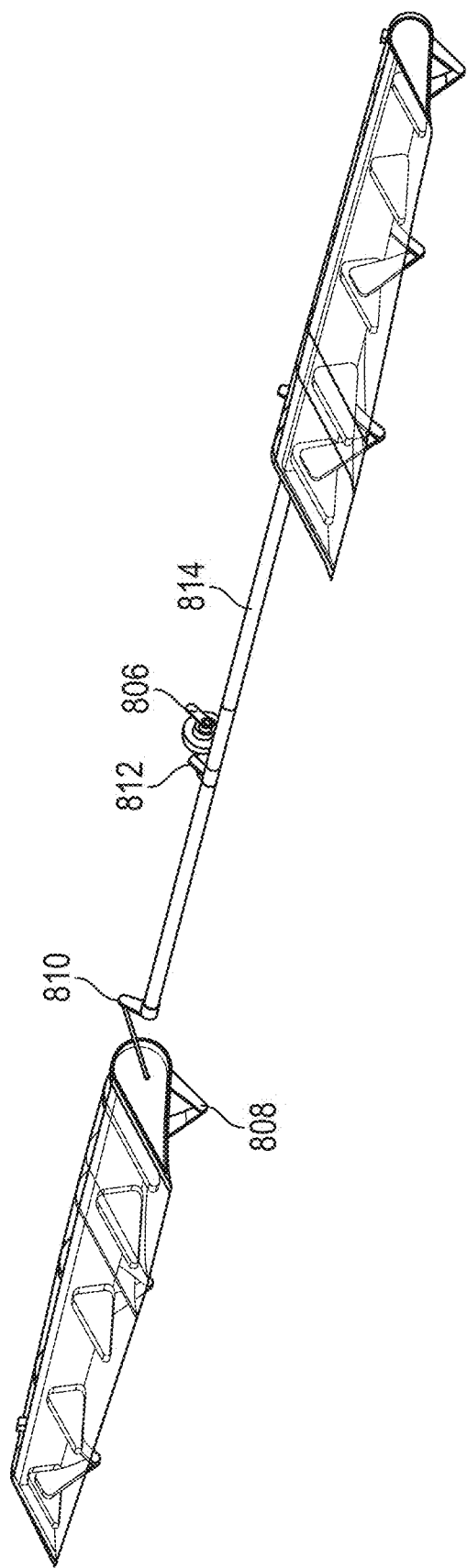
Figure 8C:
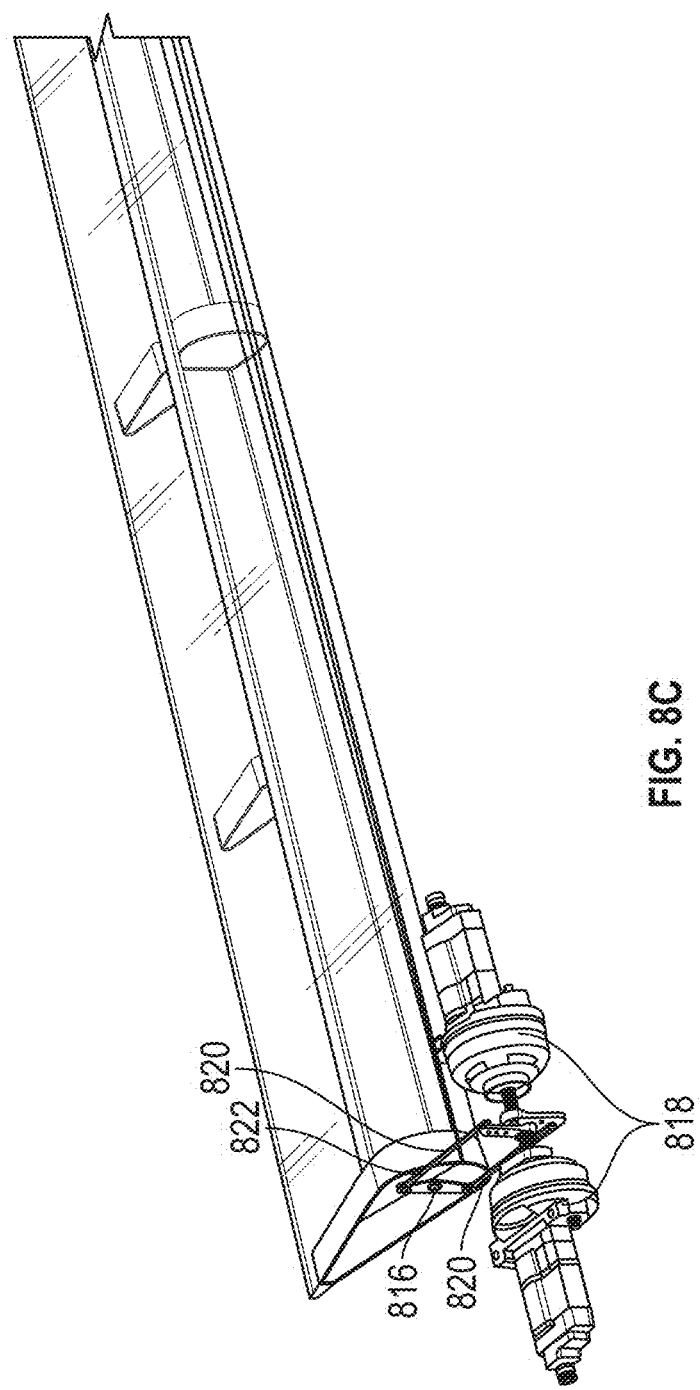
Figure 8D:
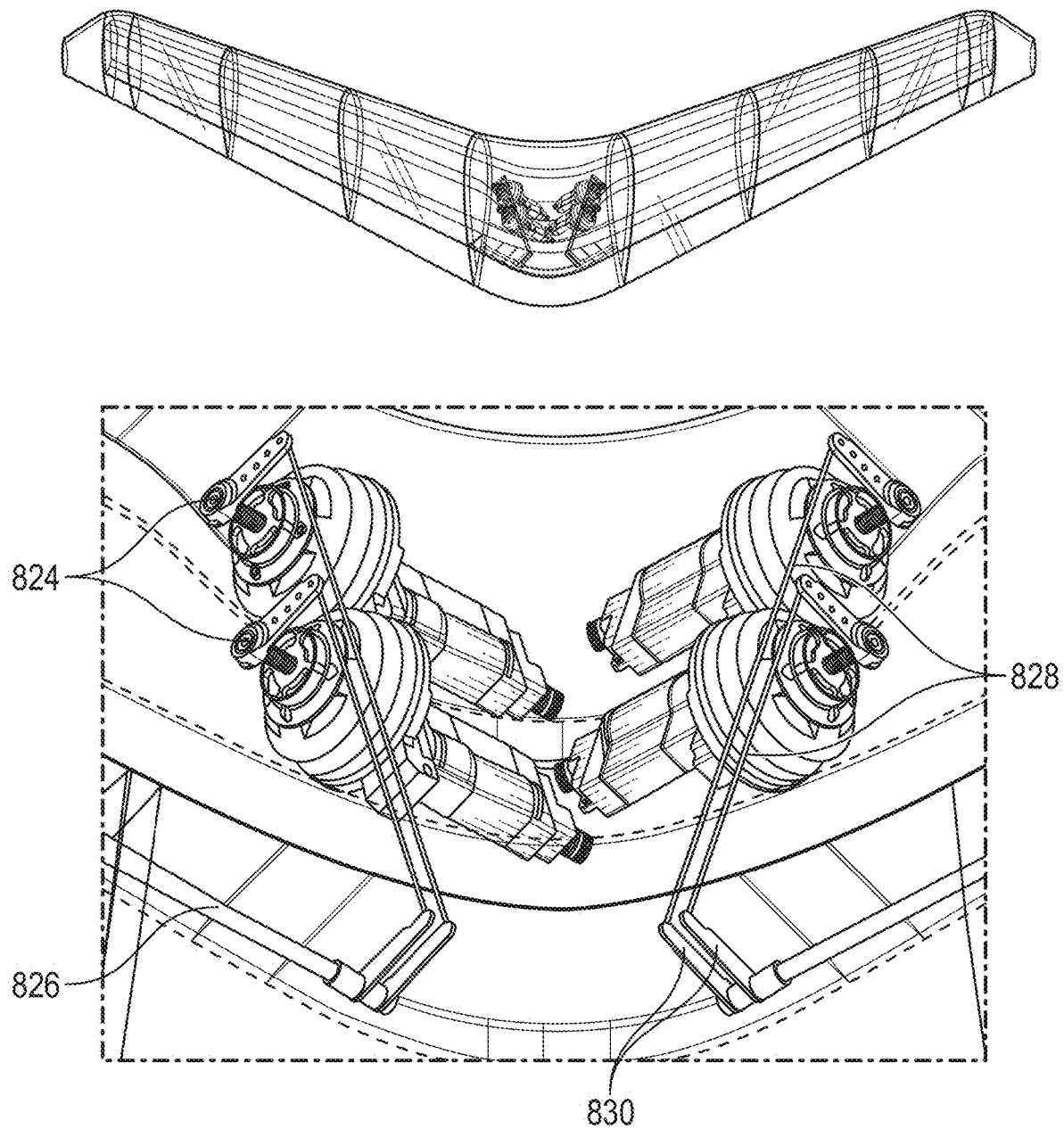

FIGS. 8A-8D illustrate example actuators, linkages, and control surfaces. For example, FIG. 8A illustrates an aircraft that includes flaps 800, ailerons 802, a ruddervator 804, and associated linkages and actuators (e.g., electric motors). FIG. 8B illustrates an example actuator (e.g., servo 806) and linkages for aircraft flaps. For example, FIG. 8B illustrates a flap drop hinge 808, an outboard flap bellcrank 810, a central flap bellcrank 812, and a flap torque tube 814. FIG. 8C illustrates example actuators (e.g., servos) and linkages for an aileron. For example, FIG. 8C illustrates an aileron bellcrank 816, aileron servos 818, aileron pushrods 820, and an aileron torque tube 822. FIG. 8D illustrates example actuators (e.g., servos) and linkages for a ruddervator. For example, FIG. 8D illustrates ruddervator servos 824, a ruddervator torque tube 826, ruddervator pushrods 828, and ruddervator bellcranks 830. In FIGS. 8B-8D, LHS, RHS, and INBD may refer to left hand side, right hand side, and inboard, respectively.

Figure 9:
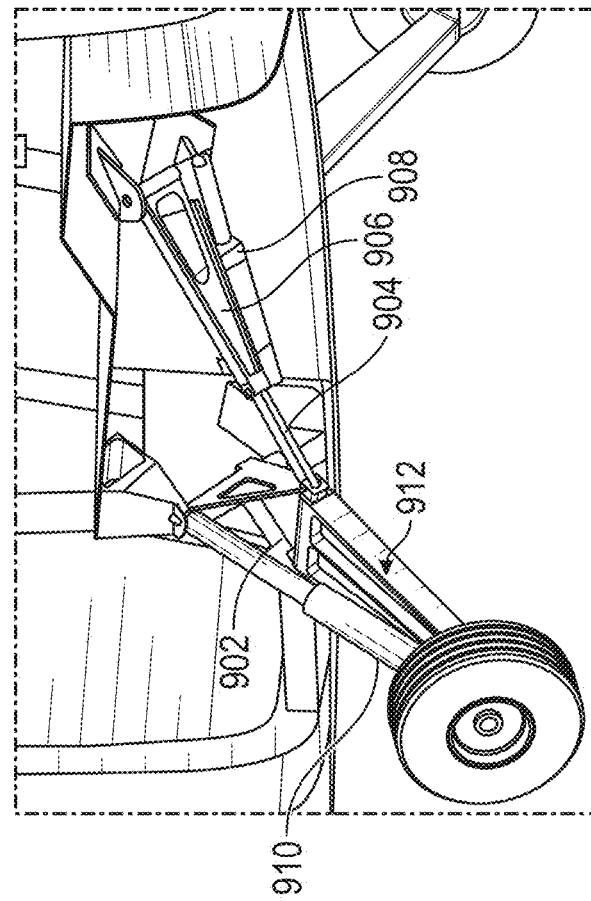
FIG. 9 illustrates example rear landing gear.
Figure 9:
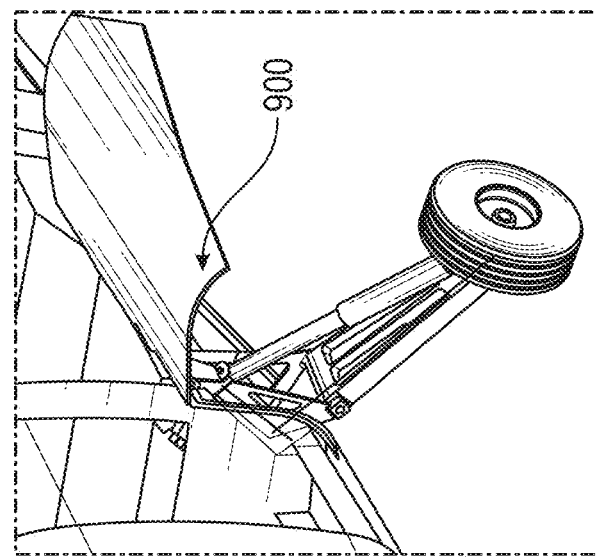

FIG. 9 illustrates example rear landing gear. For example, FIG. 9 illustrates example linkages, shocks, and an actuator included in the rear landing gear. FIG. 9 also illustrates an example landing gear door 900. Example illustrated landing gear components may include a kingpin 902, a small drag link 904, a large drag link 906, a retract actuator 908, an OLEO shock 910, and a lower leg 912. As described herein, the landing gear may be designed to fit completely inside the fuselage to eliminate unnecessary drag that could be caused in other form factors including extra landing gear housing (e.g., extra bulges in the fuselage).

The aircraft may include a variety of types of wiring and cables that interconnect various components of the aircraft. For example, wiring may connect the batteries to the aircraft components (e.g., control system, sensors, actuators, displays, etc.) in order to provide power to the components. Additionally, wiring may carry control signals, data signals, and other signals between the components. For example, the control system may control actuators via aircraft wiring. As another example, data may be transferred between sensors and computing devices via aircraft wiring. The various wires and cables may be routed through the fuselage and various passthroughs to access the different components described herein.

The aircraft may implement redundant systems to enhance reliability. For example, the aircraft may include redundant sensors, redundant computing systems (e.g., control system components), redundant actuators (e.g., redundant servos), and other redundancies.

Figure 10:
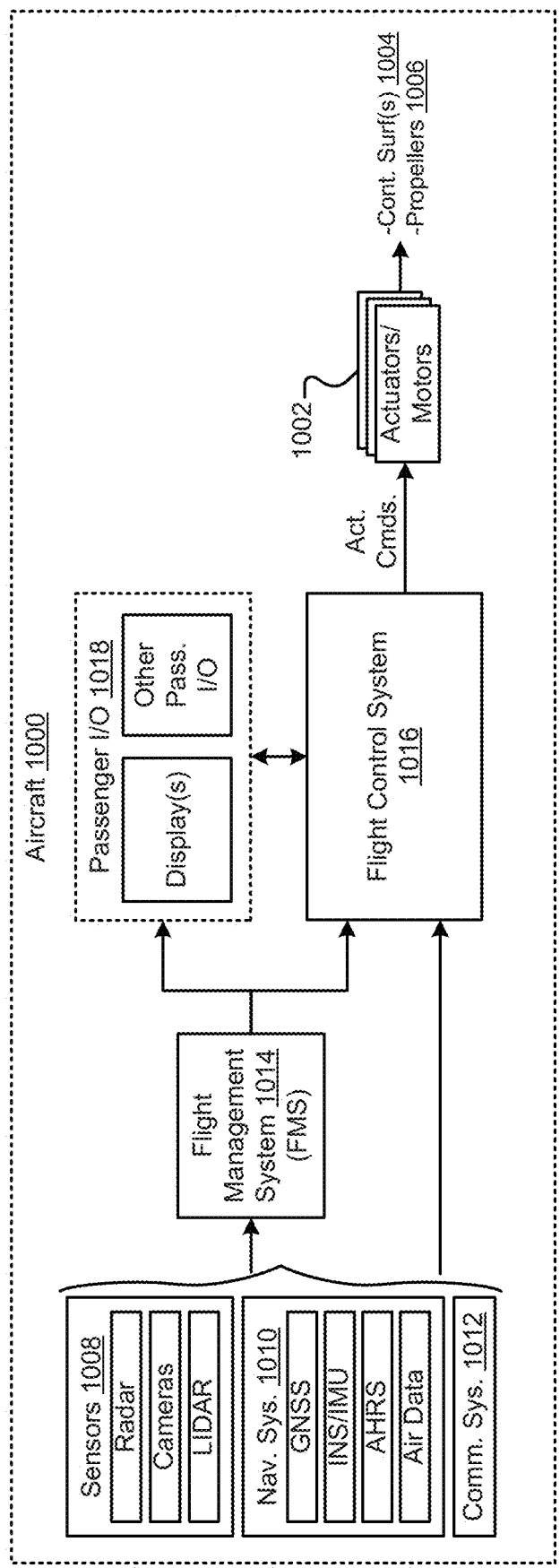
FIG. 10 is a functional block diagram of an example aircraft.

FIG. 10 is a functional block diagram of an example aircraft 1000. The example aircraft 1000 may include systems/components that control actuators 1002 (e.g., electric motors) to actuate control surfaces 1004 (e.g., using a fly by wire system). The aircraft 1000 may also include systems/components that drive the aircraft propellers 1006. The aircraft 1000 of FIG. 10 includes: 1) sensors 1008 (e.g., cameras, light detection and ranging systems, radar, etc.), 2) navigation systems 1010, 3) communication systems 1012, 4) a flight management system 1014 (FMS), 5) a flight control system 1016, 6) actuators/motors 1002, and 7) passenger input/output (I/O) 1018. The systems/components may be powered by the battery assembly. Although the aircraft 1000 may be an autonomous aircraft that may require minimal/no in-cabin pilot input, in some implementations, the aircraft 1000 may be configured to include operator/pilot I/O.

Sensors 1008 may generate sensor data, such as sensor data that can be used to detect other aircraft and objects while taxiing/flying. For example, the aircraft may include one or more radar systems, one or more electro-optical (E/O) cameras, one or more infrared (IR) cameras, and/or light detection and ranging systems (LIDAR). The radar systems and cameras may detect other aircraft (e.g., while en route). Additionally, the sensors 1008 (e.g., cameras and LIDAR) may determine whether the runway is clear when approaching for a landing.

The navigation system 1010 may generate navigation data. The navigation data may indicate the location, altitude, velocity, heading, ground track, and attitude of the aircraft. The navigation system 1010 may include a Global Navigation Satellite System (GNSS) receiver, an inertial navigation system (INS/IMU), an attitude and heading reference system (AHRS), an air data system (e.g., a Pitot-static tube, air data computer, etc.), a radar altimeter and/or a laser altimeter, an instrument landing system (ILS), and other features, such as differential GPS, Real-Time Kinematics (RTK) GPS, and/or a ground-based augmentation system for aircraft landing (GBAS).

The aircraft 1000 may include one or more communication systems 1012. For example, the aircraft may include one or more satellite communication systems, one or more ground communication systems, and one or more air-to-air communication systems. In some implementations, the communication systems 1012 may form data links. In some implementations, the communication systems 1012 may receive a flight plan data structure and/or taxiing plan from the GCS and/or air traffic control (ATC). In some implementations, the communication systems 1012 may transmit data to the GCS and/or ATC.

In some implementations, the aircraft 1000 may communicate with one or more GCSs and/or one or more ATCs located at the departure airport, destination airport, or another location. A GCS can communicate with the aircraft 1000 and ATC in a variety of manners (e.g., radio, cellular, Internet, etc.). In some implementations, a remote operator (e.g., a remote pilot) in the GCS may monitor/control the aircraft 1000. For example, a remote operator (e.g., a remote pilot) in the GCS may send a taxiing path plan to the aircraft and monitor/control execution of the taxiing path plan. As another example, the remote operator in the GCS may send flight plans/commands to the aircraft and receive data from the aircraft and other sources during flight.

The aircraft 1000 may include an FMS 1014 that may receive and/or generate one or more flight pattern data structures (i.e., flight plan data) and/or taxiing plans. A flight pattern data structure may include a sequence of waypoints that each indicate a target location for the aircraft over time. A waypoint may indicate a three-dimensional location in space, such as a latitude, longitude, and altitude (e.g., in meters). Each of the waypoints in the flight pattern data structure may also be associated with additional waypoint data, such as a waypoint time (e.g., a target time of arrival at the waypoint) and/or a waypoint speed (e.g., a target airspeed in knots or kilometers per hour). An aircraft flight control system may control the aircraft according to the generated flight pattern data structure. In some implementations, a flight pattern data structure (e.g., a landing pattern data structure) may be used to land an aircraft. In some implementations, a flight pattern data structure (e.g., a takeoff pattern data structure) may be used by an aircraft to take off from a runway. In some implementations, the aircraft 1000 may generate flight pattern data structures for navigating en route to a destination (e.g., an en route flight pattern) and/or flight pattern data structures for holding the aircraft 1000 in a defined space (e.g., a holding pattern data structure).

In some implementations, the aircraft/GCS may generate a taxiing plan for taxiing at the departure airport and/or destination airport. The taxiing plan may include a sequence of waypoints that the aircraft may traverse while taxiing. The aircraft/GCS may generate the taxiing plan based on an airport map, the aircraft starting location at the airport, the current aircraft heading, a destination location at the airport, and a destination heading for the aircraft at the destination location.

The aircraft 1000 may include a flight control system 1016 that controls the aircraft according to a taxiing plan, flight plan data structure, passenger input, and/or GCS commands. The flight control system 1016 may generate actuator setpoints based on a taxiing plan, flight plan data structure, passenger input, GCS commands, and current operating conditions. Example current operating conditions may include, but are not limited to, information regarding the state of the aircraft, such as a current location (e.g., a latitude/longitude/altitude), velocity, and aircraft attitude information. The actuator setpoints may control the actuators and the motors to follow the taxiing plan, flight plan data structure, passenger input, and/or GCS commands.

As described herein, the aircraft 1000 may include a plurality of control surfaces 1004 that may be controlled by the actuators. Example control surfaces may include, but are not limited to, ailerons, tabs, flaps, rudders, elevators, stabilizers, spoilers, elevons, elerudders, ruddervators, flaperons, landing gears, and brakes for fixed-wing aircraft. The aircraft 1000 can include actuators/linkages that control the control surfaces 1004. The actuators and linkages may vary, depending on the type of control surfaces.

The aircraft 1000 and the GCS may be configured to detect and manage one or more contingency scenarios when executing taxi plans and flight plans. Example contingency scenarios may include, but are not limited to, degradation/loss of communication, aircraft system/component failures, and other errors that may cause deviation from the planned path. The aircraft 1000 and/or the GCS may include contingency systems that may detect contingency scenarios and implement contingency management operations (e.g., generate contingency plans) in response to detecting the various contingency scenarios. The aircraft 1000 and the GCS may also be configured to detect and avoid other aircraft, terrain (e.g., mountains), and structures (e.g., buildings, powerlines, etc.).

Components of the aircraft illustrated herein, such as the systems, modules, and data may represent features included in the aircraft. The systems, modules, and data described herein may be embodied by electronic hardware, software, firmware, other aircraft avionics, or any combination thereof. Depiction of different components as separate does not necessarily imply whether the components are embodied by common or separate electronic hardware or software components. In some implementations, the components depicted herein may be realized by common electronic hardware and software components. In some implementations, the components depicted herein may be realized by separate electronic hardware and software components.

The electronic hardware and software components may include, but are not limited to, one or more processing units, one or more memory components, one or more input/output (I/O) components, and interconnect components. Interconnect components may be configured to provide communication between the one or more processing units, the one or more memory components, and the one or more I/O components. For example, the interconnect components may include one or more buses that are configured to transfer data between electronic components. The interconnect components may also include control circuits that are configured to control communication between electronic components.

The one or more processing units may include one or more central processing units (CPUs), graphics processing units (GPUs), digital signal processing units (DSPs), or other processing units. The one or more processing units may be configured to communicate with memory components and I/O components. For example, the one or more processing units may be configured to communicate with memory components and I/O components via the interconnect components.

A memory component (e.g., main memory and/or a storage device) may include any volatile or non-volatile media. For example, memory may include, but is not limited to, electrical media, magnetic media, and/or optical media, such as a random access memory (RAM), read-only memory (ROM), non-volatile RAM (NVRAM), electrically-erasable programmable ROM (EEPROM), Flash memory, hard disk drives (HDD), magnetic tape drives, optical storage technology, or any other memory components.

Memory components may include (e.g., store) data described herein. Memory components may also include instructions that may be executed by one or more processing units. For example, memory may include computer-readable instructions that, when executed by one or more processing units, cause the one or more processing units to perform the various functions attributed to the systems/modules described herein. The I/O components may refer to electronic/mechanical hardware and software that provides communication with a variety of different devices (e.g., displays, controls, etc.). For example, the I/O components may provide communication between other devices and the one or more processing units and memory components.

The systems, modules, and other components included in the aircraft described herein may be implemented by hardware/software components (e.g., one or more computing devices) that provide the described functionality. In some implementations, the various hardware components (e.g., electrical and/or mechanical hardware components) and software components may be retrofitted onto an existing aircraft in order to provide the aircraft functionality described herein. Additionally, or alternatively, the various hardware/software components may be integrated into the aircraft during manufacture. The functional block diagrams illustrated herein are meant to represent example functionality associated with the aircraft. As such, the aircraft may be implemented in a variety of different ways with different hardware/software configurations.

What is claimed is:

1. An aircraft comprising:
    a fuselage that includes:
        a nose portion that includes sensors that generate sensor data;
        a cabin portion aft of the nose portion, wherein the cabin portion includes a passenger cabin and a passenger entry area through which passengers enter the passenger cabin;
        an underwing portion aft of the cabin portion, wherein the underwing portion includes a wing attachment region at a top of the underwing portion, and wherein the underwing portion includes a battery bay that houses a battery assembly having a first plurality of batteries arranged in a first orientation and a second plurality of batteries arranged in a second orientation different from the first orientation; and
        an aft portion aft of the underwing portion;
    a wing assembly attached to the wing attachment region of the fuselage such that the underwing portion of the fuselage is located under the wing assembly, wherein the wing assembly includes motor mounts and control surfaces;
    a tail assembly attached to the aft portion of the fuselage;
    electric motors including propellers, wherein the electric motors are attached to the motor mounts such that the propellers are in a pusher configuration facing rearward, and wherein the propellers are on an opposite side of the wing assembly as the cabin portion of the fuselage; and
    an autonomous control system that controls the electric motors and the control surfaces based on the sensor data generated by the sensors included in the nose portion.

2. The aircraft of claim 1, wherein the fuselage has a tadpole fuselage shape.

3. The aircraft of claim 1, wherein the sensors include at least one of cameras, light detection and ranging systems, and radar.

4. The aircraft of claim 1, wherein the nose portion includes one or more communication systems and one or more navigation systems.

5. The aircraft of claim 1, wherein the tail assembly includes a V-tail.

6. The aircraft of claim 1, further comprising upswinging doors that hinge at the top of the cabin portion of the fuselage.

7. The aircraft of claim 6, wherein the upswinging doors are located forward of the wing assembly, and wherein the upswinging doors extend upwards above a top surface of the wing assembly.

8. The aircraft of claim 1, further comprising front landing gear and rear landing gear, wherein the front landing gear is configured to store in the nose portion of the fuselage, wherein the rear landing gear is configured to at least partially store in the aft portion of the fuselage, and wherein the fuselage is a tadpole fuselage shape when the front landing gear and the rear landing gear are stored.

9. The aircraft of claim 1, wherein the wing attachment region of the fuselage includes a forward main frame and a rear main frame that attach to the wing assembly, and wherein the aircraft includes rear landing gear that attach to at least one of the forward main frame and the rear main frame.

10. The aircraft of claim 1, further comprising a parachute system configured to deploy a parachute from the top of the aft portion of the fuselage behind the wing assembly.

11. The aircraft of claim 1, wherein the passenger cabin includes a display configured to receive passenger input and render a route for the aircraft, and wherein the passenger cabin does not include pilot controls.

12. An aircraft comprising:
    a fuselage that includes:
        a nose portion that includes sensors that generate sensor data;
        a cargo portion aft of the nose portion, wherein the cargo portion includes a cargo hold and an opening through which cargo is loaded into the cargo hold;
        an underwing portion aft of the cargo portion, wherein the underwing portion includes a wing attachment region at a top of the underwing portion, and wherein the underwing portion includes a battery bay that houses a battery assembly having a first plurality of batteries arranged in a first orientation and a second plurality of batteries arranged in a second orientation different from the first orientation; and
        an aft portion aft of the underwing portion;
    a wing assembly attached to the wing attachment region of the fuselage such that the underwing portion of the fuselage is located under the wing assembly, wherein the wing assembly includes motor mounts and control surfaces;
    a tail assembly attached to the aft portion of the fuselage;
    electric motors including propellers, wherein the electric motors are attached to the motor mounts such that the propellers are in a pusher configuration facing rearward, and wherein the propellers are on an opposite side of the wing assembly as the cargo portion of the fuselage; and
    an autonomous control system that controls the electric motors and the control surfaces based on the sensor data generated by the sensors included in the nose portion.

13. The aircraft of claim 12, wherein the fuselage has a tadpole fuselage shape.

14. The aircraft of claim 12, wherein the sensors include at least one of cameras, light detection and ranging systems, and radar.

15. The aircraft of claim 12, wherein the nose portion includes one or more communication systems and one or more navigation systems.

16. The aircraft of claim 12, wherein the tail assembly includes a V-tail.

17. The aircraft of claim 12, further comprising upswinging doors that hinge at the top of the cargo portion of the fuselage.

18. The aircraft of claim 17, wherein the upswinging doors are located forward of the wing assembly, and wherein the upswinging doors extend upwards above a top surface of the wing assembly.

19. The aircraft of claim 12, further comprising front landing gear and rear landing gear, wherein the front landing gear is configured to store in the nose portion of the fuselage, wherein the rear landing gear is configured to at least partially store in the aft portion of the fuselage, and wherein the fuselage is a tadpole fuselage shape when the front landing gear and the rear landing gear are stored.

20. The aircraft of claim 12, wherein the wing attachment region of the fuselage includes a forward main frame and a rear main frame that attach to the wing assembly, and wherein the aircraft includes rear landing gear that attach to at least one of the forward main frame and the rear main frame.

21. The aircraft of claim 12, further comprising a parachute system configured to deploy a parachute from the top of the aft portion of the fuselage behind the wing assembly.

* * * * *